United States Patent
Yamamoto

(10) Patent No.: US 12,234,894 B2
(45) Date of Patent: Feb. 25, 2025

(54) BALL SCREW DEVICE, MACHINE COMPONENT MANUFACTURING METHOD, MACHINE MANUFACTURING METHOD, VEHICLE MANUFACTURING METHOD, MACHINE COMPONENT, MACHINE, VEHICLE, HYDRAULIC FORMING METHOD, AND HYDRAULIC FORMING DIE

(71) Applicant: NSK Ltd., Tokyo (JP)

(72) Inventor: Masahito Yamamoto, Fujisawa (JP)

(73) Assignee: NSK LTD., Tokyo (JP)

( * ) Notice: Subject to any disclaimer, the term of this patent is extended or adjusted under 35 U.S.C. 154(b) by 23 days.

(21) Appl. No.: 17/928,849

(22) PCT Filed: Aug. 13, 2021

(86) PCT No.: PCT/JP2021/029835
§ 371 (c)(1),
(2) Date: Nov. 30, 2022

(87) PCT Pub. No.: WO2022/039110
PCT Pub. Date: Feb. 24, 2022

(65) Prior Publication Data
US 2023/0175577 A1     Jun. 8, 2023

(30) Foreign Application Priority Data
Aug. 19, 2020   (JP) ................. 2020-138722

(51) Int. Cl.
*B21D 26/033* (2011.01)
*F16H 25/22* (2006.01)
*F16H 25/24* (2006.01)

(52) U.S. Cl.
CPC ....... *F16H 25/2204* (2013.01); *B21D 26/033* (2013.01); *F16H 25/24* (2013.01)

(58) Field of Classification Search
CPC ..... B21D 26/033; B21D 26/02; B21D 26/047
See application file for complete search history.

(56) References Cited

U.S. PATENT DOCUMENTS

| 4,693,138 A | 9/1987 | Hughes et al. |
| 5,203,190 A * | 4/1993 | Kramer ................ B21D 26/047 72/62 |

(Continued)

FOREIGN PATENT DOCUMENTS

| DE | 112018000366 T5 | 10/2019 |
| EP | 3305430 A1 | 4/2018 |

(Continued)

OTHER PUBLICATIONS

International Search Report dated Oct. 5, 2021 from the International Searching Authority in International Application No. PCT/JP2021/029835.

(Continued)

*Primary Examiner* — Teresa M Ekiert
(74) *Attorney, Agent, or Firm* — Sughrue Mion, PLLC

(57) ABSTRACT

A ball screw device includes a nut (3), a screw shaft, and a plurality of balls arranged between the nut (3) and the screw shaft. The nut (3) includes a first member (11) disposed to surround the screw shaft, a second member (10) disposed between the screw shaft and the first member (11), and a third member (12) disposed between the first member (11) and the second member (10). The third member (12) includes a laminate body (12A) having a plurality of plates (22a, 22b) laminated in an axial direction. The laminate body (12A) includes an inner surface facing an outer surface of the second member (10). The inner surface of the laminate body (12A) has a shape corresponding to a shape of the outer surface of the second member (10).

7 Claims, 21 Drawing Sheets

(56) References Cited

U.S. PATENT DOCUMENTS

| | | |
|---|---|---|
| 2003/0126732 A1 | 7/2003 | Okada |
| 2006/0117880 A1 | 6/2006 | Osterlanger |
| 2006/0260374 A1* | 11/2006 | Lyon ............... B21D 37/02 |
| | | 72/61 |
| 2020/0408290 A1 | 12/2020 | Kubota et al. |

FOREIGN PATENT DOCUMENTS

| | | |
|---|---|---|
| JP | 02-091253 U | 7/1990 |
| JP | 05-077026 A | 3/1993 |
| JP | 05-043889 B2 | 7/1993 |
| JP | 06-101671 A | 4/1994 |
| JP | 2719487 B2 | 2/1998 |
| JP | 2763375 B2 | 6/1998 |
| JP | 11-005125 A | 1/1999 |
| JP | 11-013422 A | 1/1999 |
| JP | 3738806 B2 | 1/2006 |
| JP | 2006-509979 A | 3/2006 |
| JP | 2006-233816 A | 9/2006 |
| JP | 3843222 B2 | 11/2006 |
| JP | 2007-283389 A | 11/2007 |
| JP | 2008-055428 A | 3/2008 |
| JP | 4057297 B2 | 3/2008 |
| JP | 4504836 B2 | 7/2010 |
| JP | 4837430 B2 | 12/2011 |
| JP | 2012-061501 A | 3/2012 |
| JP | 5440680 B2 | 3/2014 |
| JP | 5662228 B2 | 1/2015 |
| JP | 2018-091454 A | 6/2018 |
| JP | 6449104 B2 | 1/2019 |
| JP | 6763676 B2 | 9/2020 |
| JP | 6861848 B2 | 4/2021 |

OTHER PUBLICATIONS

Office Action dated Nov. 30, 2021 from the Japanese Patent Office in JP Application No. 2021-564112.
Notice of Allowance dated Feb. 8, 2022 from the Japanese Patent Office in JP Application No. 2021-564112.
Extended European Search Report dated Jul. 1, 2022 from the European Patent Office in EP Application No. 21823469.8.

\* cited by examiner

BALL SCREW DEVICE, MACHINE COMPONENT MANUFACTURING METHOD, MACHINE MANUFACTURING METHOD, VEHICLE MANUFACTURING METHOD, MACHINE COMPONENT, MACHINE, VEHICLE, HYDRAULIC FORMING METHOD, AND HYDRAULIC FORMING DIE

CROSS REFERENCE TO RELATED APPLICATIONS

This application is a National Stage of International Application No. PCT/JP2021/029835, filed Aug. 13, 2021, claiming priority to Japanese Patent Application No. 2020-138722, filed Aug. 19, 2020.

TECHNICAL FIELD

The present invention relates to a ball screw device, a machine component manufacturing method, a machine manufacturing method, a vehicle manufacturing method, a machine component, a machine, a vehicle, a hydraulic forming method, and a hydraulic forming die.

BACKGROUND ART

In recent years, a hydraulic forming method has been applied to the manufacture of various machine components of an automobile and the like. In an example of the hydraulic forming method, a metallic tubular material is disposed on a radial inside of a forming peripheral surface provided in an inner peripheral surface of a forming die and a hydraulic pressure is applied to the inner peripheral surface of the tubular material so that the tubular material is plastically deformed radially outward until the tubular material has a shape along the forming peripheral surface (for example, see Japanese Patent No. 3843222 (Patent Document 1)). Such a hydraulic forming method can relatively easily form a metallic tubular member having a complicated shape.

CITATION LIST

Patent Documents

[Patent Document 1]
Japanese Patent No. 3843222

SUMMARY OF INVENTION

Technical Problem

A detailed example of a machine component manufacturing method using the hydraulic forming method will be described with reference to FIGS. 12 to 21. In the detailed example, a machine component to be manufactured is a nut 100 constituting a ball screw device. Additionally, the detailed example (including a structure of the nut 100) is an example for an unknown comparison.

As shown in FIGS. 12 to 14, the nut 100 has a tubular shape (for example, a cylindrical or square cylindrical shape). The nut 100 includes a spiral nut-side ball screw groove 101 and a circulation groove 102 formed on the inner peripheral surface. The nut-side ball screw groove 101 has a length of less than one lap (for example, 0.6 to 0.8 laps) with respect to the spiral direction which is the formation direction of the nut-side ball screw groove 101. The circulation groove 102 is a groove which connects both end portions of the nut-side ball screw groove 101 and has a substantially S shape as viewed in the radial direction. The circulation groove 102 has a groove depth that allows a ball (not shown) moving in the circulation groove 102 to get over the thread of the shaft-side ball screw groove provided in the outer peripheral surface of the screw shaft at the time of using the ball screw device.

Such a nut 100 is formed in a tubular shape as a whole by combining a tubular member 103, a holder 104, and a reinforcing material 105.

In an example, the tubular member 103 is a substantially cylindrical thin member that is formed by a hydraulic forming method to be described later. The tubular member 103 includes the nut-side ball screw groove 101 and the circulation groove 102 formed on the inner peripheral surface. The outer peripheral surface of the tubular member 103 has a shape in which the inner peripheral surface of the tubular member 103 is offset radially outward by the thickness (the plate thickness) of the tubular member 103. That is, the tubular member 103 includes a spiral overhang portion 106a which is formed at a portion located on the radial outside of the nut-side ball screw groove 101 in the outer peripheral surface to protrude radially outward in relation to the peripheral portion and includes an convex portion 106b which is formed at a portion located on the radial outside of the circulation groove 102 to protrude radially outward in relation to the peripheral portion and have a substantially S shape as viewed in the radial direction.

The holder 104 is formed in a tubular shape as a whole by combining a pair of semi-cylindrical holder elements 107. The holder 104 holds the tubular member 103 on the radial inside through the reinforcing material 105.

The reinforcing material 105 is a member for preventing the deformation of the tubular member 103 at the time of using the ball screw device. That is, a radial load and a thrust load are applied from the plurality of balls to the nut-side ball screw groove 101 of the tubular member 103 at the time of using the ball screw device. Therefore, it is necessary to prevent the deformation of the tubular member 103 which is a substantially cylindrical thin member due to these loads. Therefore, the reinforcing material 105 is disposed to fill the gap existing between the outer peripheral surface of the tubular member 103 and the inner peripheral surface of the holder 104 as closely as possible. Accordingly, the tubular member 103 is reinforced by allowing the reinforcing material 105 to support the radial load and the thrust load applied to the nut-side ball screw groove 101. The inner peripheral surface of the reinforcing material 105 has a shape matching a portion separated from the convex portion 106b in the outer peripheral surface of the tubular member 103. Further, in the example shown in the drawings, the reinforcing material 105 includes a through-hole 115 which is formed at a portion corresponding to the convex portion 106b to penetrate in the radial direction.

When assembling the ball screw device using the nut 100, the screw shaft is disposed to be inserted to the inside of the nut 100 in the radial direction. Then, a spiral load path is formed by allowing the nut-side ball screw groove 101 of the nut 100 and the spiral shaft-side ball screw groove provided in the outer peripheral surface of the screw shaft to face each other in the radial direction. Both end portions (start and end points) of the load path are connected by the circulation groove (circulation path, the non-load path) 102 of the nut 100. Then, a plurality of balls are arranged on the load path and the circulation groove 102 in a rollable manner. At the time of using the ball screw device assembled in this way, the ball that has reached the end point from the start point of the load path is returned to the start point of the load path through the circulation groove 102 in accordance with the relative rotation between the nut 100 and the screw shaft. Additionally, the start point and the end point of the load path are switched in response to the relative displacement direction (the relative rotation direction) between the screw shaft and the nut 100 in the axial direction.

When manufacturing the tubular member 103 of the nut 100 using the hydraulic forming method, first, a metallic thin cylindrical tubular material 108 shown in FIG. 15 is prepared. Then, this tubular material 108 is formed into the tubular member 103 shown in FIG. 16 by the hydraulic forming method. In the example shown in the drawings, a hydraulic forming apparatus 109 shown in FIGS. 17 to 21 is used at this time.

The hydraulic forming apparatus 109 includes a forming die 110 and a pair of lids 111*a* and 111*b*.

The forming die 110 is formed in a cylindrical shape and includes a forming peripheral surface 113 formed on the inner peripheral surface. The forming peripheral surface 113 has a shape that matches the outer peripheral surface of the completed tubular member 103. In other words, the forming peripheral surface 113 has a shape in which the inner peripheral surface of the completed tubular member 103 is substantially offset radially outward by the thickness of the tubular member 103. Particularly, in the example shown in the drawings, the forming die 110 is formed in a cylindrical shape as a whole by combining a pair of semi-cylindrical forming die elements 112*a* and 112*b*. The forming peripheral surface 113 is formed by combining the radial inner surfaces of the pair of forming die elements 112*a* and 112*b*.

Each of the pair of lids 111*a* and 111*b* is formed in a disk shape. Further, one lid 111*a* of the pair of lids 111*a* and 111*b* includes a passage hole 114 which penetrates the radial center portion in the axial direction. The pair of lids 111*a* and 111*b* are arranged on both sides of the forming die 110 in the axial direction.

When forming the tubular material 108 into the tubular member 103 using the hydraulic forming apparatus 109, first, as shown in FIGS. 17 and 18, the tubular material 108 is disposed on the radial inside of the forming peripheral surface 113 of the forming die 110 and both axial end openings of the tubular material 108 are blocked by the pair of lids 111*a* and 111*b*. Then, in this state, a fluid (liquid) is filled to the radial inside of the tubular material 108 through the passage hole 114 of one lid 111*a*. Then, the tubular member 103 is formed by plastically deforming the tubular material 108 radially outward until the tubular material has a shape along the forming peripheral surface 113 in such a manner that a hydraulic pressure (fluid pressure) is applied to the inner peripheral surface of the tubular material 108.

Then, as shown in FIG. 19, the tubular member 103 is taken out from the hydraulic forming apparatus 109 by disassembling the pair of forming die elements 112*a* and 112*b* and the pair of lids 111*a* and 111*b*. Then, the nut 100 is obtained by arranging the holder 104 and the reinforcing material 105 around the tubular member 103.

Since the shape of the forming peripheral surface 113 of the forming die 110 used in the above-described hydraulic forming method is directly transferred to the tubular member, it is possible to improve the accuracy of the tubular member by increasing the machining accuracy according to the accuracy required for the tubular member. However, in the case of a complicated shape, the cost for forming the forming peripheral surface 113 (each inner radial surface of the pair of forming die elements 112*a* and 112*b*) increases and the manufacturing cost of the forming die 110 increases.

An aspect of the present invention is to provide a ball screw device, a machine component manufacturing method, a machine manufacturing method, a vehicle manufacturing method, a machine component, a machine, a vehicle, a hydraulic forming method, and a hydraulic forming die which are advantageous for cost reduction.

Solution to Problem

A ball screw device according to an aspect of the present invention includes a nut, a screw shaft, and a plurality of balls arranged between the nut and the screw shaft. The nut includes a first member disposed to surround the screw shaft, a second member disposed between the screw shaft and the first member, and a third member disposed between the first member and the second member. The third member includes a laminate body having a plurality of plates laminated in an axial direction. The laminate body includes an inner surface facing an outer surface of the second member. The inner surface of the laminate body has a shape corresponding to a shape of the outer surface of the second member.

In an example, the outer surface of the second member has a convex shape, and the inner surface of the laminate body has a concave shape substantially matching the convex shape of the second member.

In an example, the plurality of plates of the laminate body include a plurality of annular plates, and the plurality of annular plates are formed such that peripheral shapes of inner peripheral surfaces are substantially the same as each other and/or the peripheral shapes of the inner peripheral surfaces are different from each other.

In an example, the plurality of plates of the laminate body include phase matching portions each provided at a specific position in a circumferential direction.

In an example, a material of the third member is different from a material of the second member.

In an example, the inner surface of the laminate body includes a plurality of steps based on a difference in inner surface height of two adjacent plates.

In an example, the plurality of plates of the third member include a first plate and a second plate having a thickness different from that of the first plate.

A machine according to an aspect of the present invention includes the ball screw device.

A vehicle according to an aspect of the present invention includes the ball screw device.

A machine component manufacturing method according to an aspect of the present invention includes: preparing a forming die with a laminate body having a plurality of plates laminated in an axial direction, the laminate body including an inner surface for a forming; disposing a process material on the inside of the forming die; plastically deforming the process material toward the inner surface of the forming die by applying a hydraulic pressure to an inner surface of the process material; and assembling parts by using a plurality of components including the plastically deformed process material and the laminate body.

A machine component according to an aspect of the present invention is manufactured by the above-described manufacturing method.

A machine according to an aspect of the present invention includes the machine component.

A vehicle according to an aspect of the present invention includes the machine component.

A machine manufacturing method according to an aspect of the present invention includes manufacturing a machine component by using the above-described manufacturing method.

A vehicle manufacturing method according to an aspect of the present invention includes manufacturing a machine component by using the above-described manufacturing method.

A hydraulic forming method according to an aspect of the present invention includes: preparing a tubular forming die with a laminate body having a plurality of plates laminated in an axial direction, the laminate body including an inner peripheral surface for a forming; disposing a process material on the inside of the tubular forming die; and plastically deforming the process material toward the inner peripheral surface of the tubular forming die by applying a hydraulic pressure to an inner surface of the process material.

A hydraulic forming die according to an aspect of the present invention includes a tubular laminate body having a plurality of plates laminated in an axial direction, and the laminate body includes an inner peripheral surface for a forming.

Advantageous Effects of Invention

According to an aspect of the present invention, it is possible to provide a ball screw device, a machine component manufacturing method, a machine manufacturing method, a vehicle manufacturing method, a machine component, a machine, a vehicle, a hydraulic forming method, and a hydraulic forming die which are advantageous for cost reduction.

DESCRIPTION OF EMBODIMENTS

Figure 1:
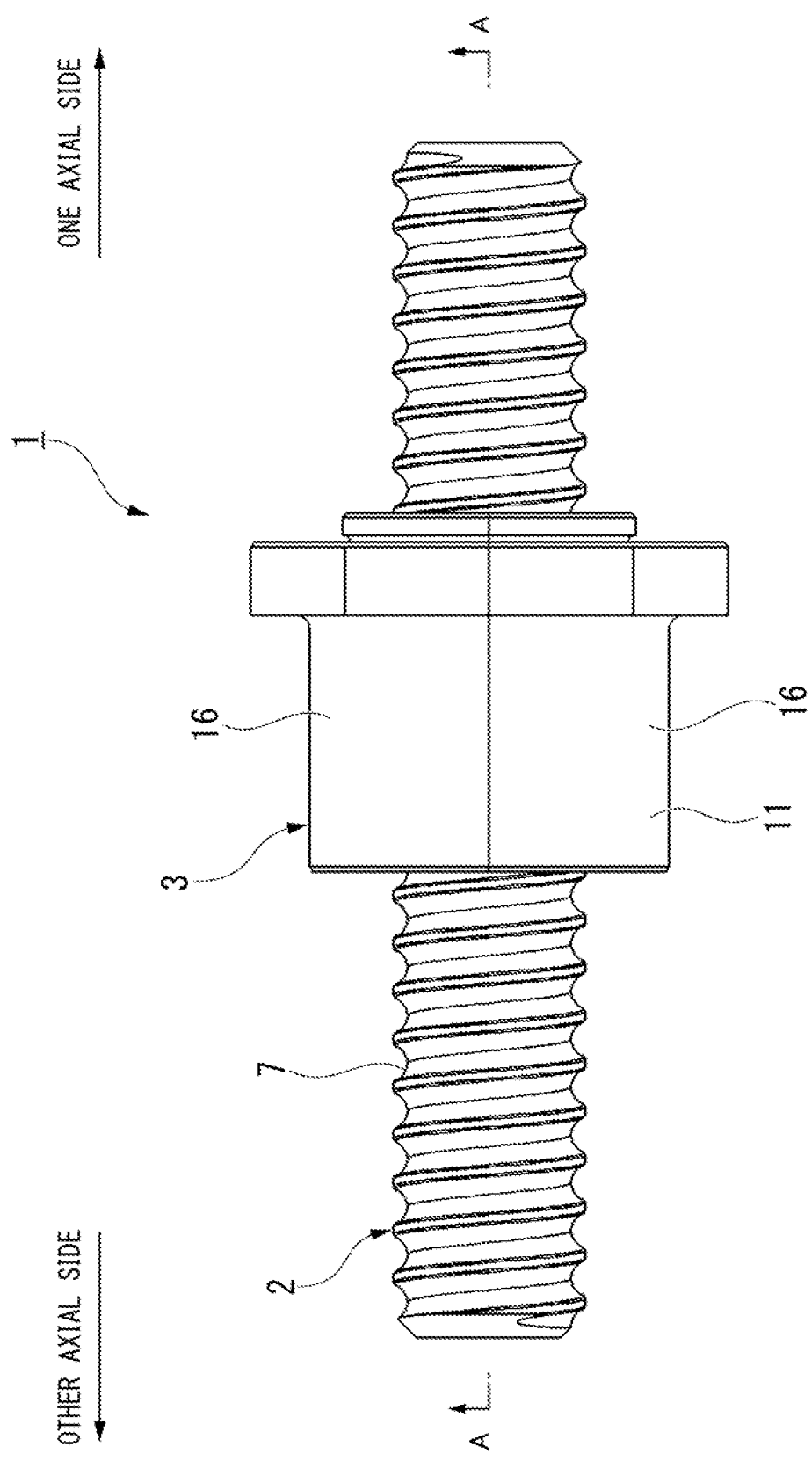
FIG. 1 is a plan view showing a ball screw device.

An embodiment of the present invention will be described with reference to the drawings. In an example, a nut of a ball screw device is applied as a machine component. In another example, various machine components with formed elements (elements to be formed) are applicable to the present invention.

A ball screw device 1 of this example is incorporated in various machines such as an electric brake device or an automatic manual transmission (AMT) of a vehicle and a positioning device of a machine tool and is used to operate a driven unit by converting a rotational motion of a drive source such as an electric motor into a linear motion.

The ball screw device 1 includes a screw shaft 2, a nut 3 corresponding to a machine component, and a plurality of balls 4 arranged between the nut 3 and the screw shaft 2. The ball screw device 1 is not limited to the examples described below, and various forms can be applied.

Additionally, in the following description of the ball screw device 1, the axial direction, the radial direction, and the circumferential direction are referred to as the axial direction, the radial direction, and the circumferential direction of the screw shaft 2 and the nut 3 unless otherwise specified. Regarding the ball screw device 1, one side in the axial direction is the right side of FIGS. 1, 2, 3, and 5 and the other side in the axial direction is the left side of FIGS. 1, 2, 3, and 5.

The screw shaft 2 is inserted to the inside of the tubular nut 3 in the radial direction and is disposed coaxially with the nut 3. A spiral load path 5 (see FIG. 2) exists between the outer peripheral surface of the screw shaft 2 and the inner peripheral surface of the nut 3. Both end portions (start and end points) of the load path 5 are connected by a circulation groove (circulation path, non-load path) 9 formed on the inner peripheral surface of the nut 3. The plurality of balls 4 are arranged on the load path 5 and the circulation groove 9 in a rollable manner. The ball 4 that has reached the end point from the start point of the load path 5 in accordance with the relative rotation between the screw shaft 2 and the nut 3 is returned to the start point of the load path 5 through the circulation groove 9. Additionally, the start point and the end point of the load path are switched in accordance with the relative displacement direction (the relative rotation direction) between the screw shaft 2 and the nut 3 in the axial direction. The ball screw device 1 is used to move the screw shaft 2 linearly with respect to the nut 3 by relatively rotating the nut 3 with respect to the screw shaft 2 or is used to move the nut 3 linearly with respect to the screw shaft 2 by relatively rotating the screw shaft 2 with respect to the nut 3. Hereinafter, the structure of each component of the ball screw device 1 will be described.

Figure 2:
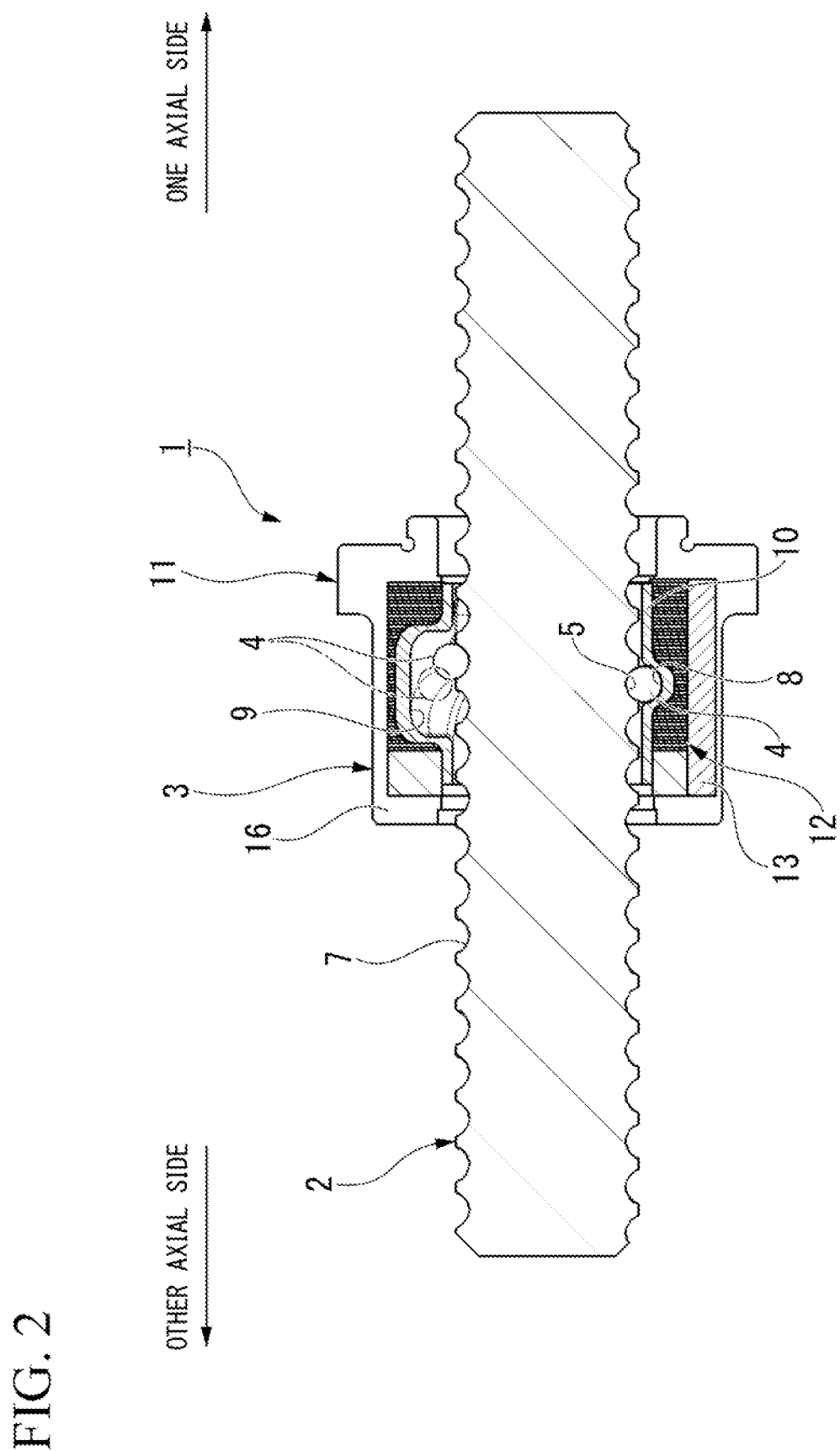
FIG. 2 is a cross-sectional view taken along a line A-A of FIG. 1.

As shown in FIGS. 1 and 2, the screw shaft 2 is formed of metal and includes a spiral shaft-side ball screw groove 7 formed on the outer peripheral surface. The shaft-side ball screw groove 7 is formed by subjecting the outer peripheral surface of the screw shaft 2 to a grinding process (cutting process) or a rolling process. In this example, the number of sets of the shaft-side ball screw grooves 7 is a pair. The groove shape (groove bottom shape) of the cross-section of the shaft-side ball screw groove 7 is a Gothic arch groove or a circular arc groove.

The nut 3 includes a first member (holder 11) disposed to surround the screw shaft, a second member (formed member 10) disposed between the screw shaft 2 and the holder 11, and a third member (reinforcing material 12) disposed between the holder 11 and the formed member 10. In an example, as shown in FIGS. 1 to 6, the nut 3 is formed in a cylindrical shape and has a spiral nut-side ball screw groove 8 and the circulation groove 9 formed on the inner peripheral surface. The nut-side ball screw groove 8 has the same lead as the shaft-side ball screw groove 7. Therefore, the shaft-side ball screw groove 7 and the nut-side ball screw groove 8 are arranged to face each other in the radial direction while the screw shaft 2 is disposed to be inserted to the inside of the nut 3 in the radial direction and constitute the spiral load path 5. Similarly to the shaft-side ball screw groove 7, the number of sets of the nut-side ball screw grooves 8 is a pair. The groove shape of the cross-section of the nut-side ball screw groove 8 is a Gothic arch groove or a circular arc groove similarly to the shaft-side ball screw groove 7. For example, the nut-side ball screw groove 8 has a length of less than one lap (for example, 0.6 to 0.8 laps) with respect to the spiral direction which is the formation direction of the nut-side ball screw groove 8. The circulation groove 9 is a groove which connects both end portions of the nut-side ball screw groove 8 and has a substantially S shape as viewed in the radial direction. As shown in FIG. 2, the circulation groove 9 has a groove depth that allows the ball 4 moving in the circulation groove 9 to get over the thread of the shaft-side ball screw groove 7. In another example, different types of nuts which are different from the above-described example are applicable.

In this example, the nut 3 is formed in a tubular shape (for example, a cylindrical shape) as a whole by combining the formed member 10, the holder 11, the reinforcing material 12, and a key 13.

Figure 8:
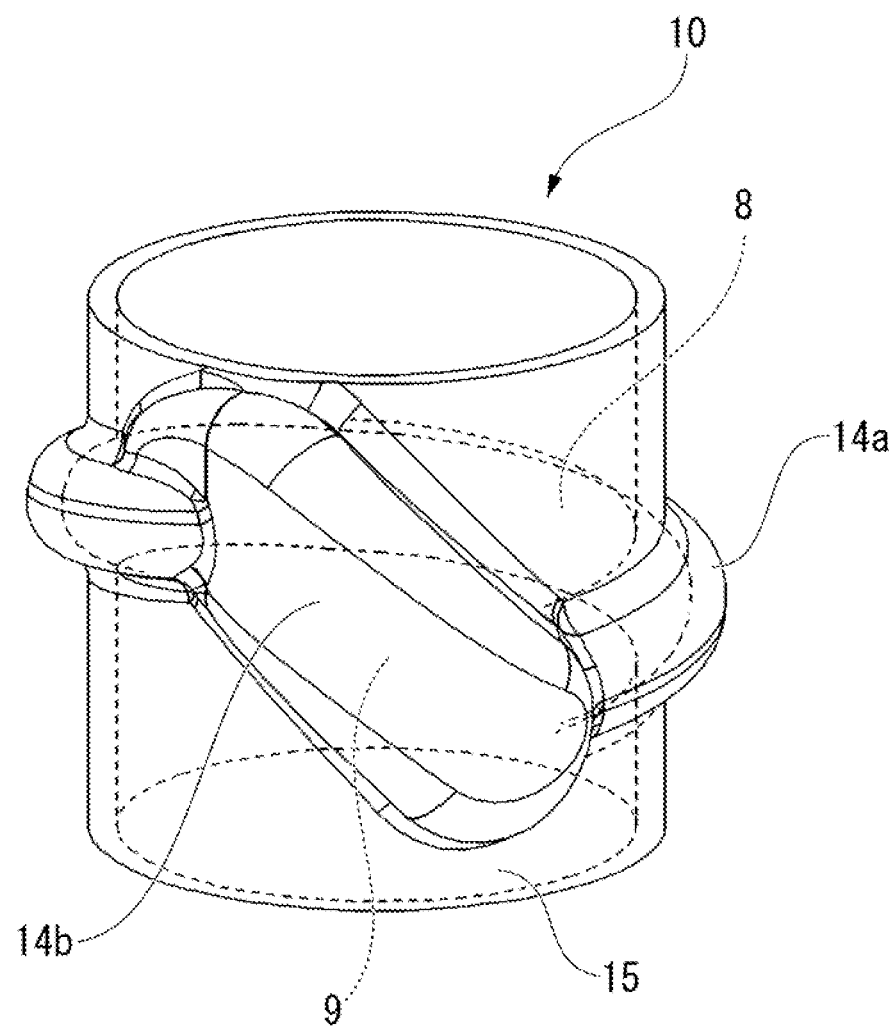
FIG. 8 is a perspective view of a tubular member.

The formed member 10 is a member that is formed by a hydraulic forming method to be described later. In an example, the formed member 10 is a substantially cylindrical thin member that is formed of metal (for example, bearing steel (SUJ2)). Alternatively, the formed member 10 is formed of another material. Alternatively, the formed member 10 has a shape different from the tubular shape. In an example, the formed member (tubular member) 10 includes the nut-side ball screw groove 8 and the circulation groove 9 formed on the inner peripheral surface. The outer peripheral surface of the tubular member 10 has a shape in which the inner peripheral surface of the tubular member 10 is offset radially outward by the thickness of the tubular member 10. That is, as shown in FIG. 8, the tubular member 10 includes a spiral convex portion 14a which is formed at a portion located on the radial outside of the nut-side ball screw groove 8 in the outer peripheral surface to overhang radially outward in relation to the peripheral portion and a convex portion 14b which is formed at a portion located on the radial outside of the circulation groove 9 to overhang radially outward in relation to the peripheral portion and have a substantially S shape as viewed in the radial direction. Further, a portion separated from the nut-side ball screw groove 8 and the circulation groove 9 in the inner peripheral surface of the tubular member 10 and a portion separated from the convex portions 14a and 14b in the outer peripheral surface of the tubular member 10 are formed by cylindrical surfaces arranged coaxially with each other.

Figure 5:
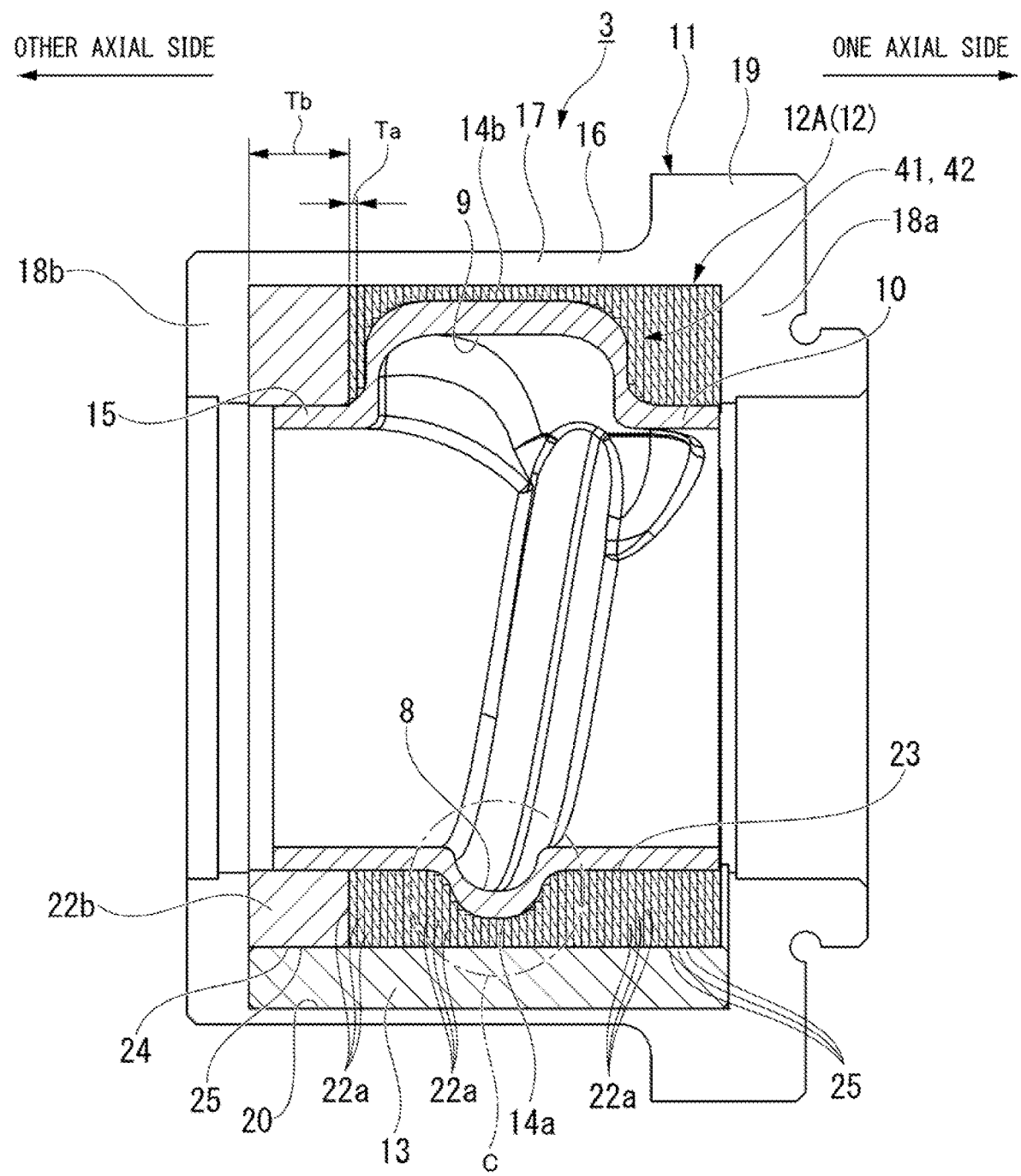
FIG. 5 is a cross-sectional view taken along a line B-B of FIG. 4.

Further, in the structure of this example, the tubular member 10 includes a cylindrical portion 15 which is formed at an end portion on the other side in the axial direction as a portion not provided with the nut-side ball screw groove 8, the circulation groove 9, and the convex portions 14a and 14b (see FIGS. 5 and 8). Additionally, such a cylindrical portion can be provided not only at the end portion on the other side of the tubular member in the axial direction but also at the end portion on one side of the tubular member in the axial direction or cannot be provided at the end portions on both sides of the tubular member in the axial direction.

Additionally, the nut-side ball screw groove 8 is a portion in which the plurality of balls 4 roll while receiving a compressive load. Therefore, in this example, the metal material forming the tubular member 10 is a metal material having excellent durability against rolling fatigue and rolling friction, such as bearing steel.

Figure 3:
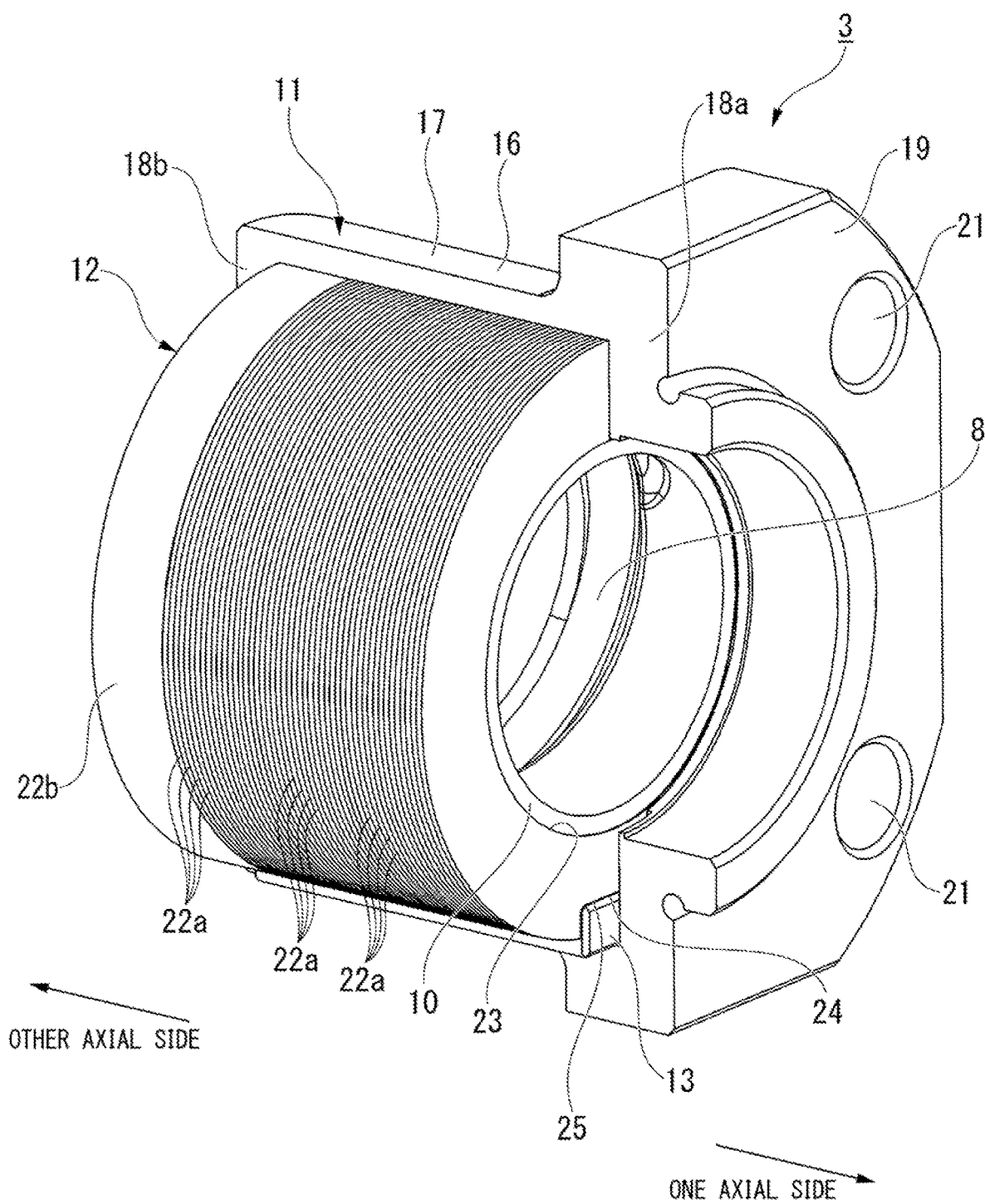
FIG. 3 is a perspective view showing a nut by omitting one holder element of a pair of holder elements.

Particularly, as shown in FIG. 3, the holder 11 is formed in a cylindrical shape and holds the tubular member 10 on the radial inside through the reinforcing material 12 and the key 13. The holder 11 includes a cylindrical tubular portion 17, inward flange portions 18a and 18b which protrude radially inward from both end portions of the tubular portion 17 in the axial direction, and an outward flange portion 19 which protrudes radially outward from one end portion of the tubular portion 17 in the axial direction.

Figure 4:
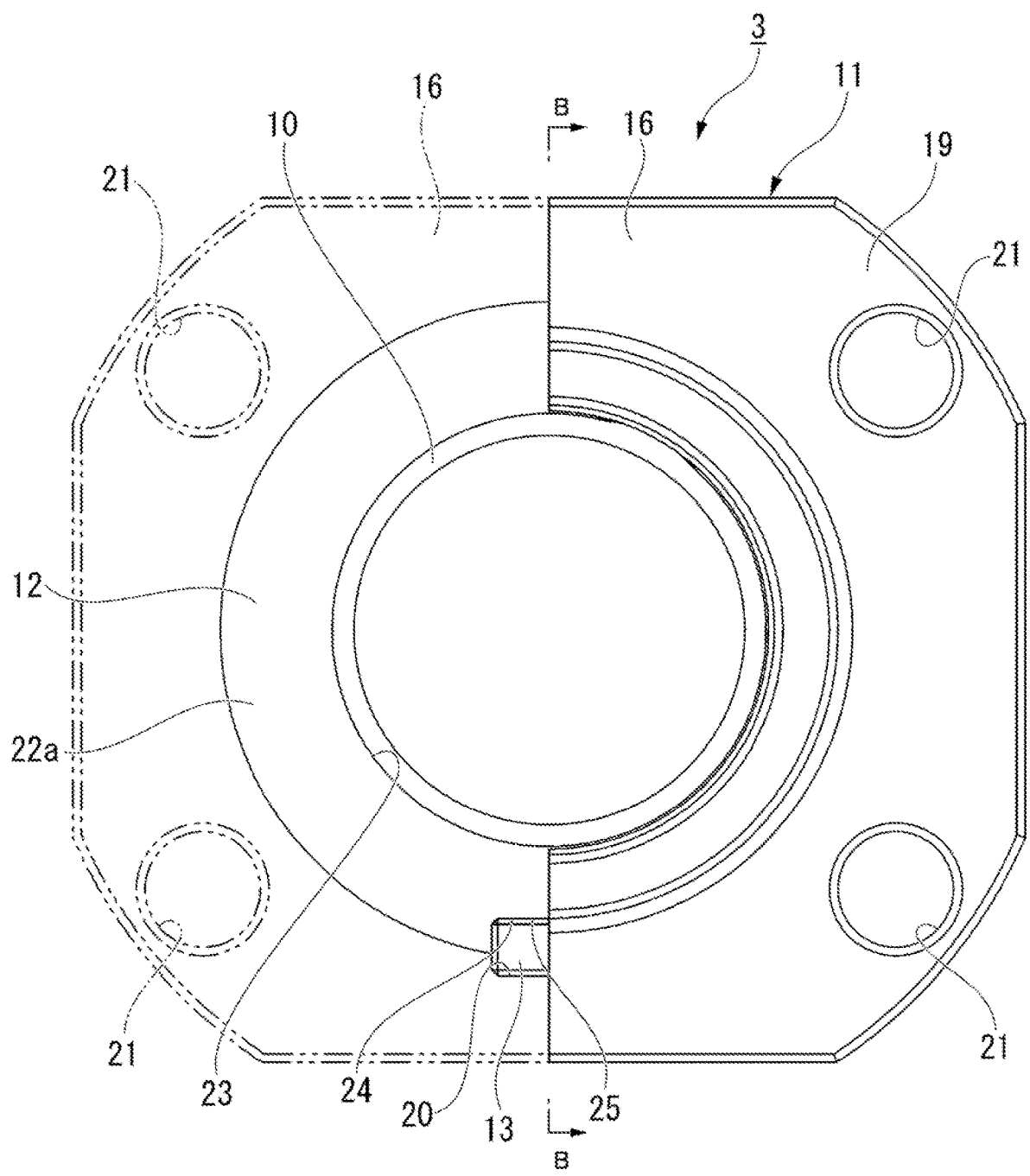
FIG. 4 is a view of the nut as viewed from the right side of FIG. 3.

Particularly, as shown in FIG. 4, the tubular portion 17 includes an outer key groove 20 which is formed at one position of the inner peripheral surface in the circumferential direction to extend in the axial direction. The outer key groove 20 is provided over the entire length of the inner peripheral surface of the tubular portion 17 in the axial direction and has a rectangular cross-sectional shape. The outer radial half of the metal square columnar key 13 engages with the outer key groove 20 without rattling. That is, in this state, the inner radial half of the key 13 protrudes radially inward in relation to the portion separated from the outer key groove 20 in the inner peripheral surface of the tubular portion 17.

The outward flange portion 19 includes an attachment hole 21 which is formed at a plurality of positions in the circumferential direction to penetrate in the axial direction. When using the ball screw device 1 of this example, the holder 11 is joined and fixed to a member that rotates or moves linearly together with the nut 3 using a bolt inserted or screwed to each attachment hole 21.

In this example, the holder 11 is formed in a cylindrical shape as a whole by combining a pair of metallic semi-cylindrical holder elements 16. The pair of holder elements 16 are joined and fixed to each other by an appropriate method such as adhering, welding, or caulking. The outer key groove 20 is formed so as to hang between the inner peripheral surfaces of the pair of holder elements 16. Additionally, the type of material forming the holder element 16 is not particularly limited as long as the strength level required for the holder 11 can be satisfied and the formability of the holder element 16 can be ensured when implementing the present invention. By using a member (cast steel, die-cast aluminum alloy, ceramics, polymer member by injection molding, or the like) formed of a material that is cheaper than a metal material such as bearing steel as the holder element 16, the material cost of the holder element 16 can be suppressed.

The reinforcing material 12 is a metallic member that prevents the deformation of the tubular member 10 at the time of using the ball screw device 1. That is, a radial load and a thrust load are applied from the plurality of balls 4 to the nut-side ball screw groove 8 provided in the inner peripheral surface of the tubular member 10 at the time of using the ball screw device 1. Therefore, it is necessary to prevent the deformation of the tubular member 10 which is a substantially cylindrical thin member due to these loads. Therefore, in this example, the reinforcing material 12 is disposed to fill the gap existing between the outer peripheral surface of the tubular member 10 and the inner peripheral surface of the tubular portion 17 of the holder 11 as closely as possible. Accordingly, the tubular member 10 is reinforced by allowing the reinforcing material 12 to support the radial load and the thrust load applied to the nut-side ball screw groove 8.

Further, in this example, such a reinforcing material 12 is used as a forming die 30 at the time of forming the tubular member 10 by the hydraulic forming method as will be described later. In other words, in this example, the forming die 30 is used as the reinforcing material 12 when forming the tubular member 10 by the hydraulic forming method.

In an example, such a reinforcing material 12 is formed in a cylindrical shape. In another example, the reinforcing material 12 is formed in a shape different from the cylindrical shape. In an example, the reinforcing material 12 is provided to extend in the entire circumferential direction. In another example, the reinforcing material 12 is provided to extend in a part of the circumferential direction. In another example, the reinforcing material 12 includes a plurality of components arranged in the circumferential direction. The reinforcing material 12 is disposed to fill the gap existing between the outer peripheral surface of the tubular member 10 and the inner peripheral surface of the tubular portion 17 of the holder 11 as close as possible and is sandwiched from both sides in the axial direction by the pair of inward flange portions 18a and 18b of the holder 11.

At least a part of the inner surface (the inner peripheral surface) of such a reinforcing material 12 includes an inner surface (forming peripheral surface) 23 which faces the outer surface of the tubular member 10. The forming peripheral surface 23 is the peripheral surface for forming the outer peripheral surface of the tubular member 10 at the time of forming the tubular member 10 by the hydraulic forming method. Such a forming peripheral surface 23 has a shape substantially matching the outer peripheral surface of the tubular member 10. In an example, the outer surface of the tubular member 10 has a convex shape 41 and the inner surface 23 of the reinforcing material 12 has a concave shape 42 substantially matching the convex shape of the tubular member 10. At least a part of the inner surface 23 of the reinforcing material 12 has a contour substantially along the contour of the outer surface of the tubular member 10. In the cross-section of the axial direction, the contour of the outer surface of the tubular member 10 and the contour of the inner surface 23 of the reinforcing material 12 have substantially matching curved shapes. In the cross-section intersecting the axial direction, the contour of the outer surface of the tubular member 10 and the contour of the inner surface 23 of the reinforcing material 12 have substantially matching curved shapes. For example, the inner surface (the forming peripheral surface) 23 has a shape in which the inner peripheral surface of the tubular member 10 is substantially offset radially outward by the thickness of the tubular member 10.

Further, the reinforcing material 12 includes an inner key groove 24 (see FIG. 9) which is formed at one circumferential position of the outer peripheral surface to extend in the axial direction. The inner key groove 24 is provided over the entire length in the axial direction of the outer peripheral surface of the reinforcing material 12 and has a rectangular cross-sectional shape. The inner radial half of the key 13 engages with the inner key groove 24 without rattling. Accordingly, the circumferential position of the reinforcing material 12 with respect to the holder 11 is regulated. Further, a portion separated from the inner key groove 24 in outer peripheral surface of the reinforcing material 12 has a shape (cylindrical surface shape) matching a portion separated from the outer key groove 20 in the inner peripheral surface of the tubular portion 17 of the holder 11.

Figure 9:
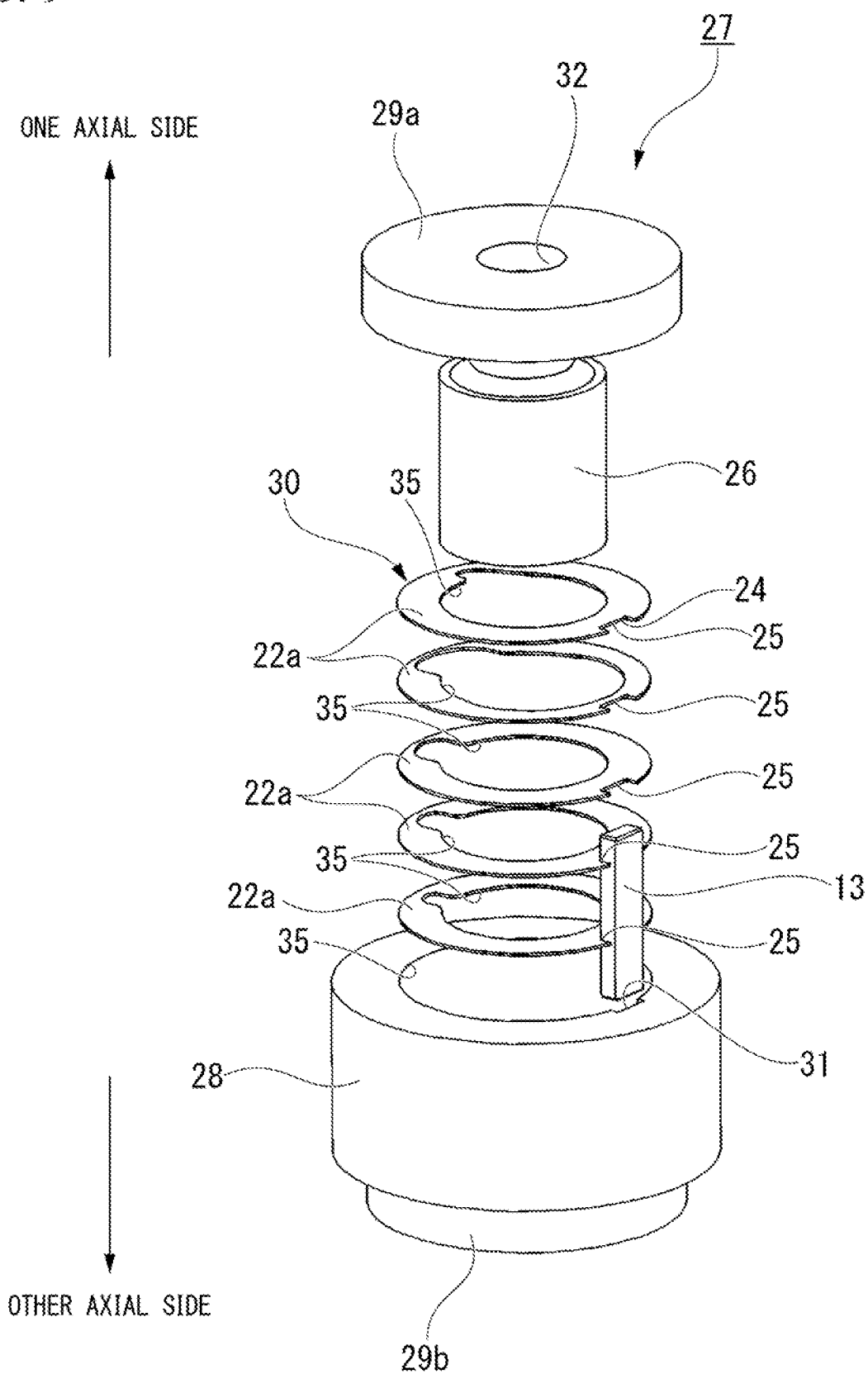
FIG. 9 is an exploded perspective view of a hydraulic forming apparatus and a tubular material.

The reinforcing material (third member) 12 has a laminated structure (laminate body) in which the plurality of plates (plate materials 22a and 22b) are laminated in the axial direction. In an example, a laminate body 12A includes the inner surface 23 which faces the outer surface of the tubular member (second member) 10 and the inner surface 23 of the laminate body 12A has a shape (42) corresponding to a shape (41) of the outer surface of the tubular member 10. In this example, the reinforcing material 12 is formed in a cylindrical shape as a whole by laminating a plurality of (N number of (N: natural number)) flat plate materials 22a and 22b including the inner peripheral surfaces 35 (FIG. 9). That is, each of the plate materials 22a and 22b has a shape (an inner peripheral surface shape and an outer peripheral surface shape) in which the cylindrical reinforcing material 12 is cut by a virtual plane orthogonal to the center axis of the reinforcing material 12. The plurality of plates (22a, 22b) of the reinforcing material 12 (the laminate body 12A) includes a plurality of annular plates. The plurality of annular plates are formed such that the peripheral shapes of the inner peripheral surfaces 35 are substantially the same as each other and/or the peripheral shapes of the inner peripheral surfaces 35 are different from each other (FIG. 9). The forming peripheral surface 23 is formed by combining the inner peripheral surfaces 35 of the plurality of plate materials 22a and 22b. Further, each of the plate materials 22a and 22b includes a rectangular notch 25 corresponding to a phase matching engagement portion at one circumferential position of the outer peripheral surface. The plurality of plates (the plate materials 22a and 22b) of the reinforcing material 12 include a phase matching portion (for example, a flat portion, a groove portion, a curved portion, a hole portion, and a notch portion) 25 provided at a specific position in the circumferential direction. The inner key groove 24 is formed by combining the notches 25 of the plurality of plate materials 22a and 22b. Additionally, when implementing the present invention, the phase matching engagement portion may be, for example, an insertion hole through which a pin or the like is inserted.

Figure 6:
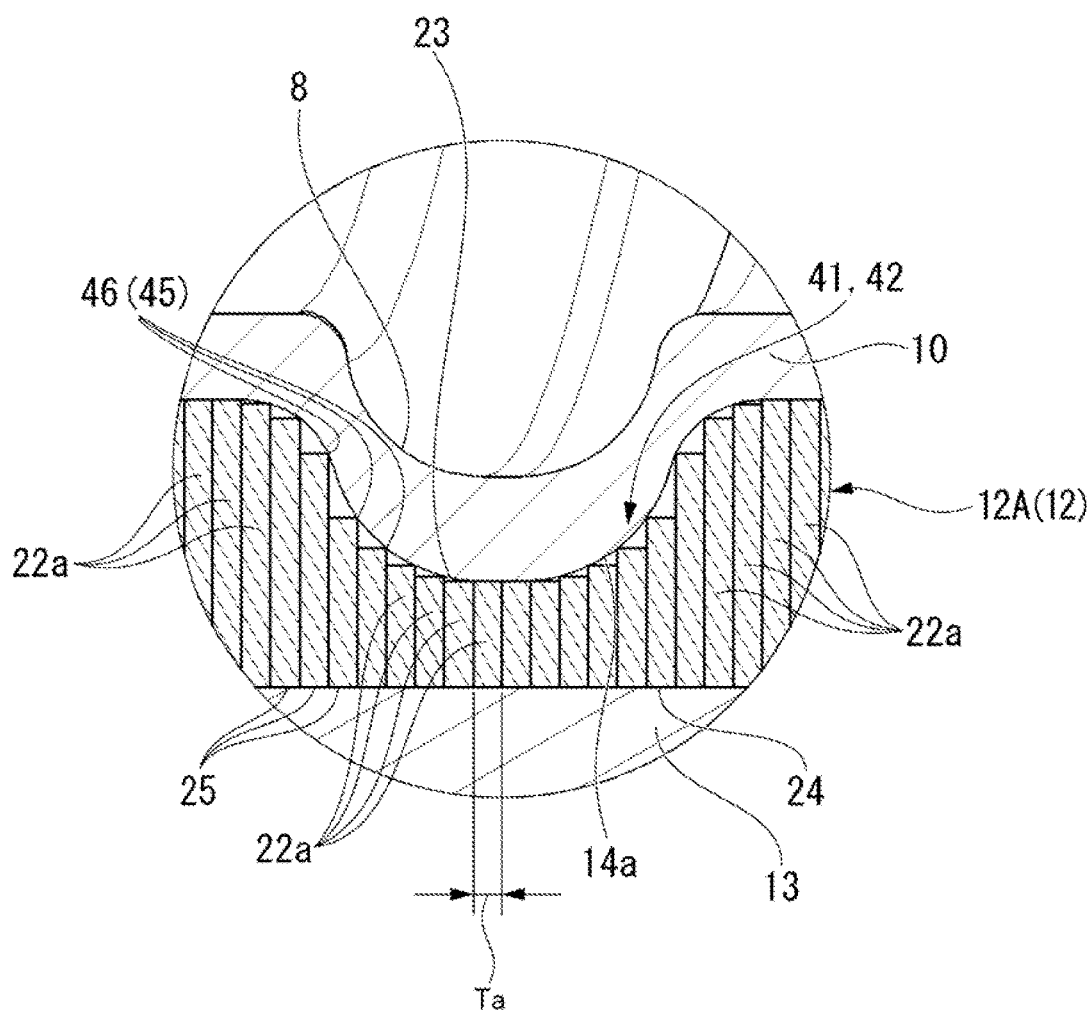
FIG. 6 is an enlarged view of a C part of FIG. 5.

In this example, each of the plate materials 22a and 22b is formed by subjecting a metal plate as a material to a press punching process or a laser cutting process. Therefore, the cross-sectional shape of each inner peripheral surface of the plate materials 22a and 22b is, as shown in FIG. 6, a linear shape extending in the axial direction. Additionally, when implementing the present invention, the type of material forming the plate materials 22a and 22b is not particularly limited if the reinforcement level required for the reinforcing material 12 is satisfied and formability of the plate materials 22a and 22b can be ensured. However, from the viewpoint of suppressing the material cost of the reinforcing material 12, the plate materials 22a and 22b are preferably formed by plate materials (plate materials formed of steel, light metal, ceramics, polymer materials, and the like) formed of materials that are cheaper than metal materials such as bearing steels forming the tubular member 10. In other words, each of the tubular member 10 and the plate materials 22a and 22b is preferably formed of a different material. The material of the reinforcing material 12 (the laminate body 12A) is different from the material of the tubular member 10.

Further, in this example, the axial cross-sectional shape of each inner peripheral surface of the plate materials 22a and 22b is a linear shape. For example, the linear shape extends in the axial direction. Alternatively, the linear shape extends in a direction inclined with respect to the axial direction. In another example, the axial cross-section of each inner surface of the plate materials 22a and 22b has a shape (for example, an uneven shape and a curved shape) different from the linear shape. In an example, the inner surface of the reinforcing material 12 (the laminate body 12A) includes a plurality of steps (a plurality of corners, a plurality of fine protrusions) 45 based on a difference in inner surface height of two adjacent plates. At least a part of the plurality of steps 45 extends in the circumferential direction. Protruding portions (corners, tops) 46 of the plurality of steps 45 correspond to the edges of the plurality of plates. A line connecting the protruding portions (corners, tops) 46 of the plurality of steps 45 in the axial cross-section has a curved shape substantially matching the curved shape of the contour of the outer surface of the tubular member 10. In an example, the reinforcing material 12 adopts the following configuration in order to ensure the shape accuracy of the forming peripheral surface 23. That is, the plurality of plate materials (22a, 22b) of the reinforcing material 12 include a plurality of plate materials having different thicknesses. The plurality of plate materials (22a, 22b) of the reinforcing material 12 include a first plate and a second plate having a thickness different from that of the first plate. In this example, the plurality of plate materials (22a, 22b) have a plurality of different thicknesses set according to the axial positions of the plate materials 22a and 22b. The number of types of plate thickness can be 2, 3, 4, 5, 6, 7, 8, 9, 10, or more.

Specifically, the thickness "Ta" (see FIGS. 5 and 6) of each of the plate materials arranged around at least the convex portions 14a and 14b of the tubular member 10 in the plurality of (N number of) plate materials 22a and 22b constituting the reinforcing material 12, specifically, the first to the (N−1)-th plate materials 22a counting from one side in the axial direction is sufficiently small. Accordingly, the radial step between the inner peripheral surfaces of the plate materials 22a adjacent to each other in the axial direction is decreased and the shape accuracy of the portion matching the convex portions 14a and 14b in the forming peripheral surface 23 is ensured. In other words, the portion matching the convex portions 14a and 14b in the forming peripheral surface 23 is brought closer to a smooth curved surface. In other words, the (N−1)-th plate material 22a counting from one side in the axial direction is the second plate material 22a counting from the other side in the axial direction. Further, each of the first to the (N−1)-th plate materials 22a counting from one side in the axial direction has an inner peripheral surface shape according to the axial position corresponding to the own arrangement position. However, in this example, for convenience of description, a common reference numeral "22a" is used as the reference numeral of the plate material.

Additionally, the shape accuracy of the portion matching the convex portions 14a and 14b of the tubular member 10 in the forming peripheral surface 23 becomes more satisfactory as the thickness Ta of the plate material 22a becomes smaller. Thus, the thickness Ta of the plate material 22a can be appropriately set in accordance with the shape accuracy required for the portion matching the convex portions 14a and 14b of the tubular member 10 in the forming peripheral surface 23.

Further, in this example, in the plurality of (N number of) plate materials 22a and 22b constituting the reinforcing material 12, the plate material disposed around the cylindrical portion 15 of the tubular member 10 is only the N-th one plate material 22b counting from one side in the axial direction, in other words, only one plate material 22b located on the side closest to the other side in the axial direction. The thickness "Tb" (see FIG. 5) of the plate material 22b is sufficiently larger than the thickness Ta of the plate material 22a (Tb>>Ta) and is slightly larger than the axial dimension of the cylindrical portion 15 in the example shown in the drawings. The outer peripheral surface of the cylindrical portion 15 is formed as a cylindrical surface of which a cross-sectional shape does not change in the axial direction. Therefore, even when the plate material disposed around the cylindrical portion 15 is only one plate material 22b, the shape accuracy of the portion matching the outer peripheral surface of the cylindrical portion 15 in the forming peripheral surface 23 can be satisfactory. In this way, in this example, the number of the plate materials forming the reinforcing material 12 is suppressed by setting the plate material disposed around the cylindrical portion 15 as only one plate material 22b. However, when implementing the present invention, a plurality of plate materials can be arranged around the cylindrical portion 15. In this case, for example, the thickness of each of these plate materials can be the same as or larger than Ta.

Each of the plurality of balls 4 is formed of steel or ceramics and is disposed in the load path 5 and the circulation groove 9 in a rollable manner. The ball 4 disposed in the load path 5 rolls while receiving a compressive load, whereas the ball 4 disposed in the circulation groove 9 is pushed to roll by a subsequent ball 4 without receiving a compressive load.

As understood from the description above, in this example, the thickness "Ta" of the plate material 22a disposed at the axial position corresponding to the portion in which the ball 4 of the nut 3 is disposed is thinner than the thickness "Tb" of the plate material 22b disposed at the axial position corresponding to the portion in which the ball 4 of the nut 3 is not disposed (Ta<<Tb).

Figure 7:
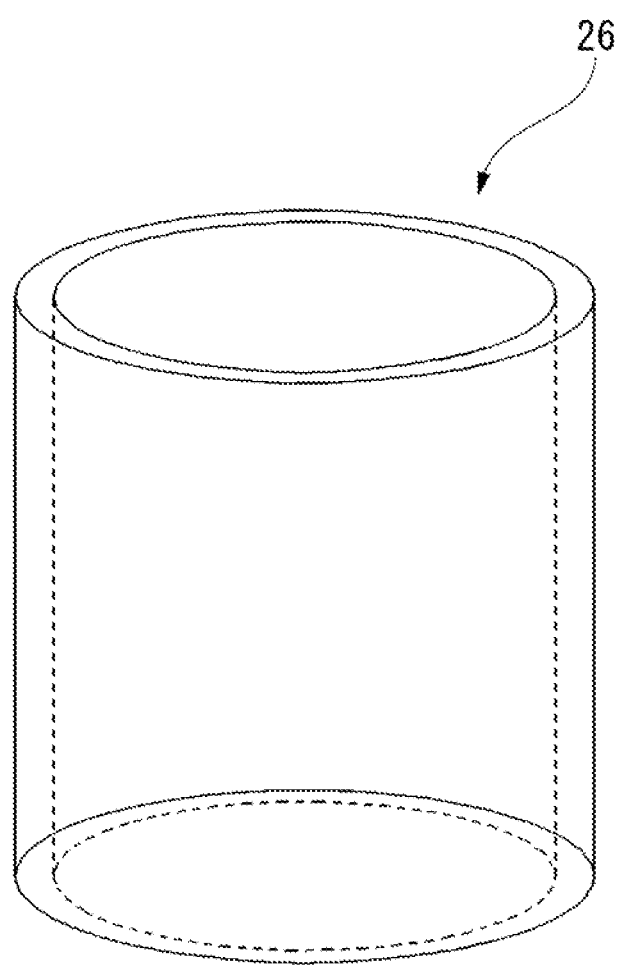
FIG. 7 is a perspective view of a tubular material.
Figure 10:
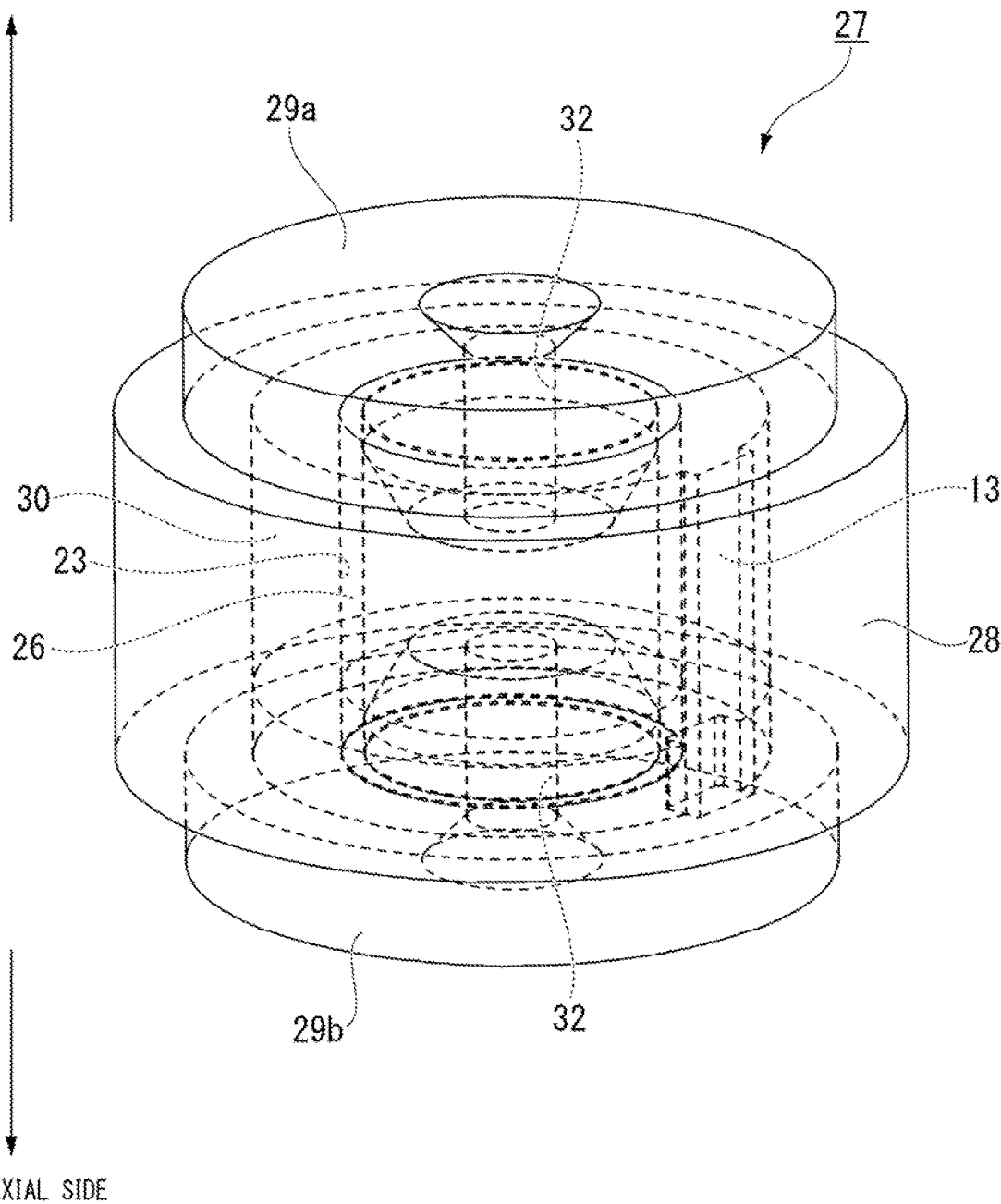
FIG. 10 is a perspective view of the hydraulic forming apparatus and the tubular material.

In this example, in order to manufacture the ball screw device 1, a metallic thin cylindrical tubular material 26 shown in FIG. 7 is first prepared when manufacturing the nut 3. Then, the tubular material 26 is formed into the tubular member 10 shown in FIG. 8 by the hydraulic forming method. In this example, at this time, a hydraulic forming apparatus 27 shown in FIGS. 9 and 10 is used. The manufacturing method includes preparing the forming die (tubular forming die) 30 including the laminate body 12A in which a plurality of plates are laminated in the axial direction, disposing a process material (tubular material 26) on the inside of the forming die 30, plastically deforming the process material 26 toward the inner surface of the forming die 30 by applying a hydraulic pressure to the inner surface of the process material 26, and assembling parts using a plurality of components including the plastically deformed process material 26 and the forming die (laminate body) 30.

The hydraulic forming apparatus 27 includes an outer cylinder member 28, a pair of lids 29a and 29b, and the forming die 30 corresponding to the hydraulic forming die.

The outer cylinder member 28 is formed in a cylindrical shape and includes a key holding groove 31 which is formed at one circumferential position of the inner peripheral surface to extend in the axial direction. The key holding groove 31 is provided over the entire length of the inner peripheral surface of the outer cylinder member 28 in the axial direction and has a rectangular cross-sectional shape.

Each of the pair of lids 29a and 29b is formed in a disk shape and includes a passage hole 32 which penetrates the radial center portion in the axial direction. The pair of lids 29a and 29b are arranged on both sides of the outer cylinder member 28 in the axial direction.

The forming die 30 is formed by the reinforcing material 12 (laminate body 12A) which is a member constituting the nut 3 to be manufactured. The forming die (laminate body) 30 includes an inner surface for a forming (inner peripheral surface).

When forming the tubular material 26 into the tubular member 10 by using the hydraulic forming apparatus 27, first, the cylindrical forming die 30 (reinforcing material 12) is formed by laminating the plurality of plate materials 22a and 22b and the forming die 30 (reinforcing material 12) is disposed on the radial inside of the outer cylinder member 28 without rattling in the radial direction. Further, in this state, the outer radial portion of the key 13 is engaged with the key holding groove 31 and the inner radial portion of the key 13 is engaged with the inner key groove 24 of the forming die 30 (reinforcing material 12). Accordingly, the circumferential position of the forming die 30 (reinforcing material 12) with respect to the outer cylinder member 28 is regulated. Additionally, if the notch 25 of each of the plate materials 22a and 22b is engaged with the inner radial portion of the key 13 when forming the cylindrical forming die 30 (reinforcing material 12) by laminating the plurality of plate materials 22a and 22b, it is easy to match the phases of the plate materials 22a and 22b in the circumferential direction.

Next, the tubular material 26 is disposed on the radial inside of the forming peripheral surface 23 provided in the inner peripheral surface of the forming die 30 (reinforcing material 12).

Next, both axial end openings of the tubular material 26 are blocked by the pair of lids 29a and 29b as shown in FIG. 10. Then, in this state, a fluid (liquid) is filled into the radial inside of the tubular material 26 through each passage hole 32 of the lids 29a and 29b. Then, the tubular member 10 is formed by plastically deforming the tubular material 26 radially outward until the tubular material has a shape along the forming peripheral surface 23 in such a manner that the hydraulic pressure (fluid pressure) is applied to the inner peripheral surface of the tubular material 26. Additionally, when implementing the present invention, a passage hole for supplying a fluid to the radial inside of the tubular material 26 can be provided only at one lid of the pair of lids.

Figure 11:
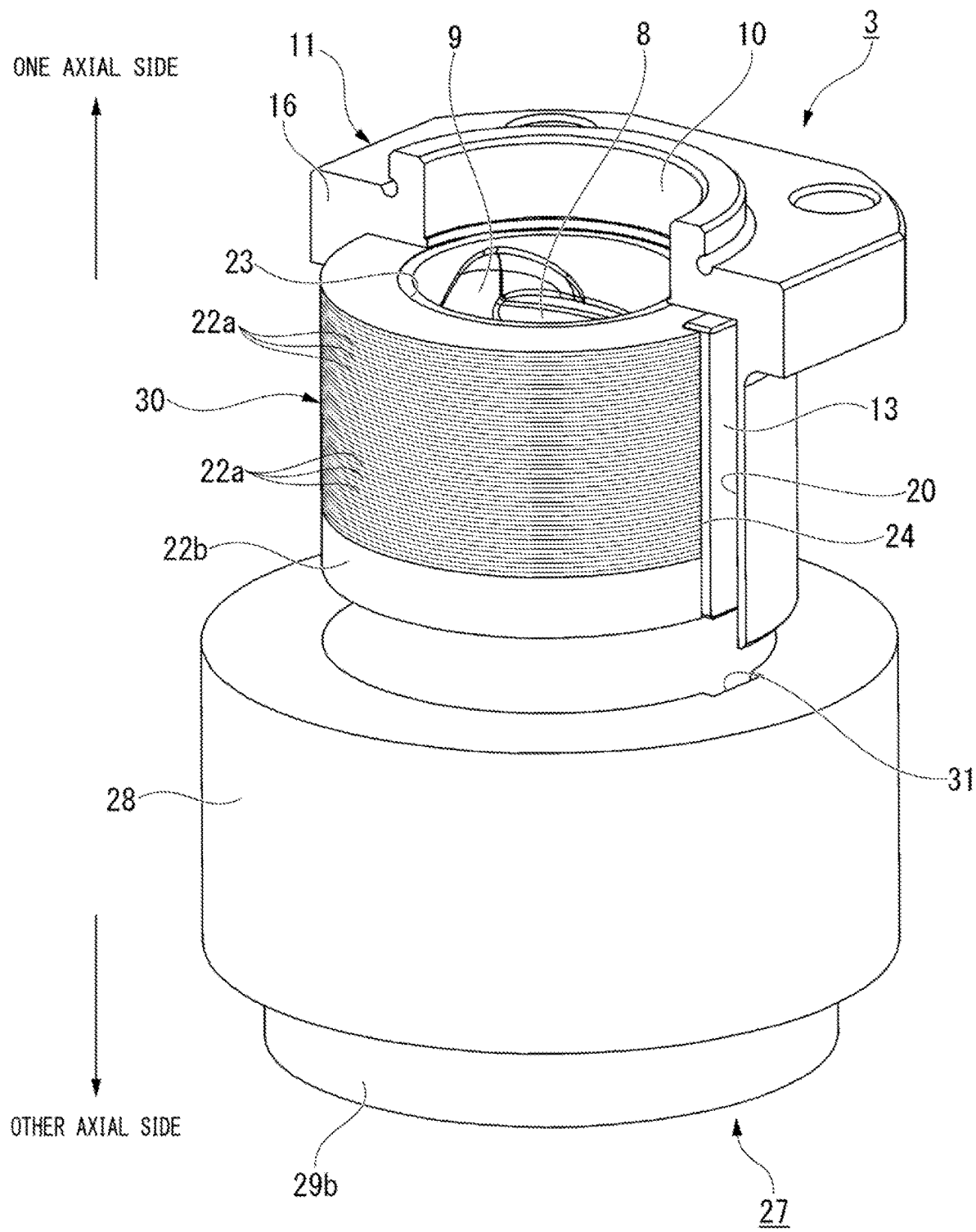
FIG. 11 is a perspective view showing a state in which a holder is assembled to an assembly of a tubular member, a key, and a forming die taken out from the hydraulic forming apparatus.
Figure 12:
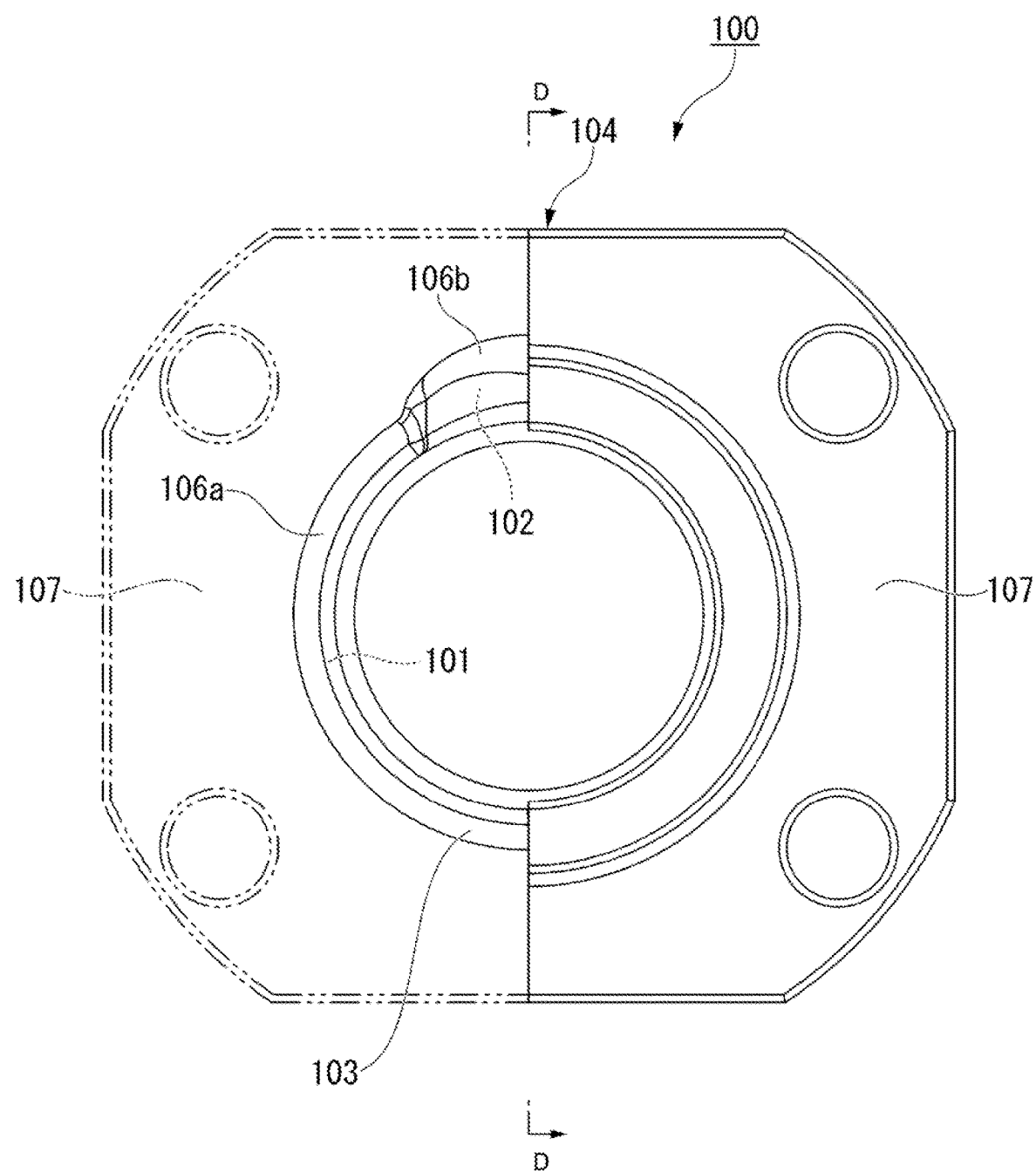
FIG. 12 is a view of a nut of a comparative example when one holder element of a pair of holder elements is shown by a virtual line from an axial direction.
Figure 13:
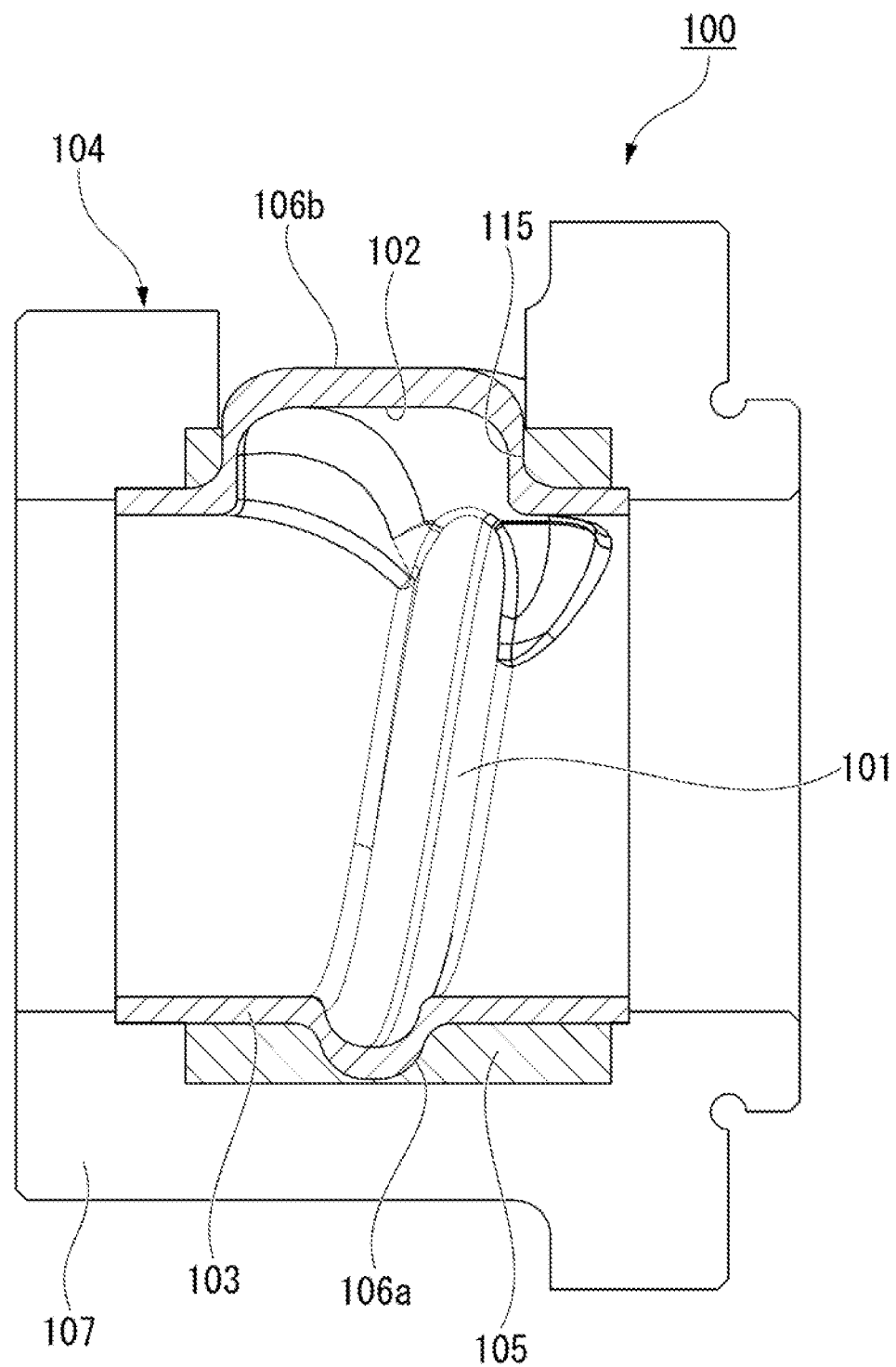
FIG. 13 is a cross-sectional view taken along a line D-D of FIG. 12.
Figure 14:
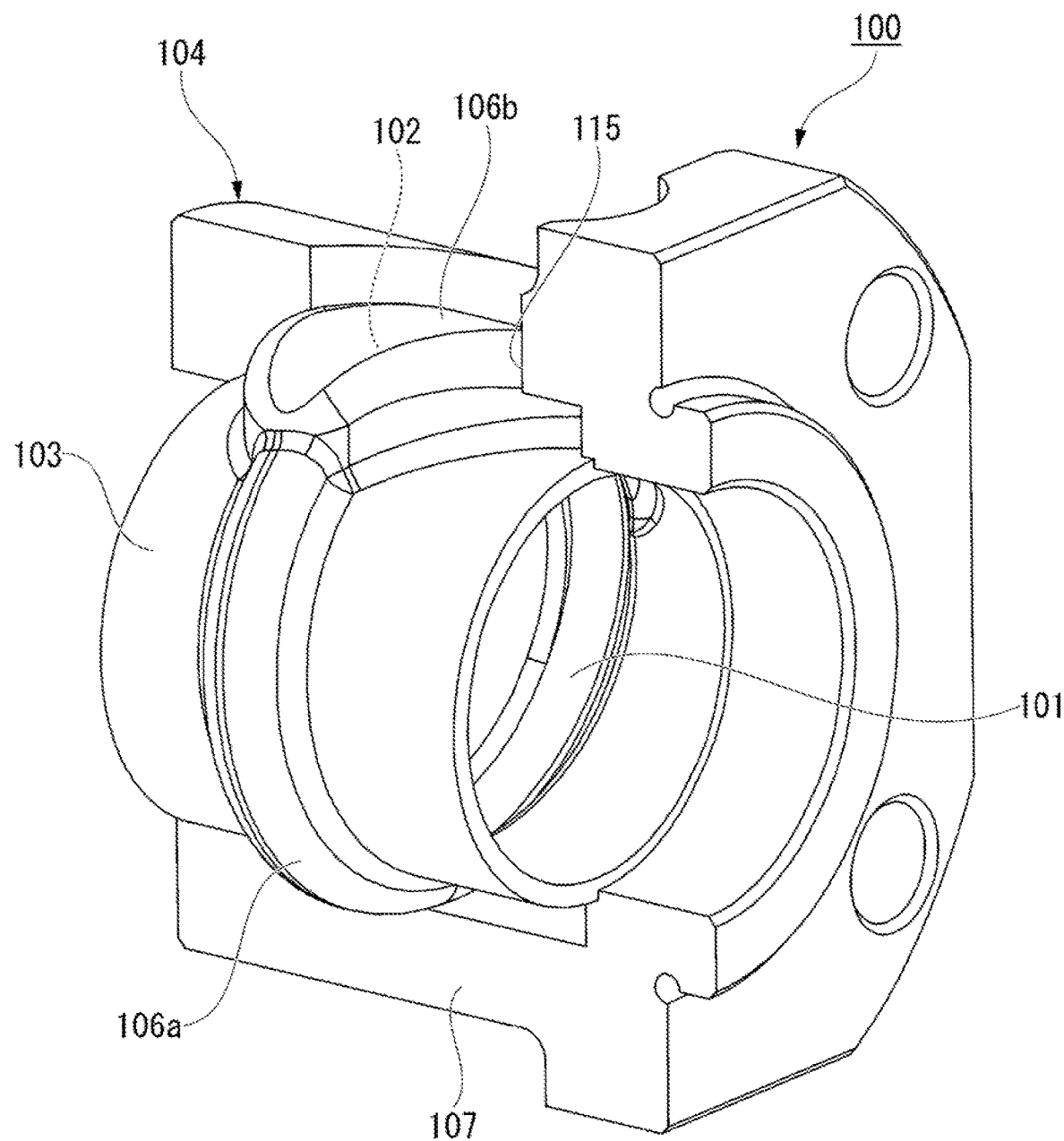
FIG. 14 is a perspective view showing a nut of a comparative example by omitting one holder element of a pair of holder elements and a reinforcing material.
Figure 15:
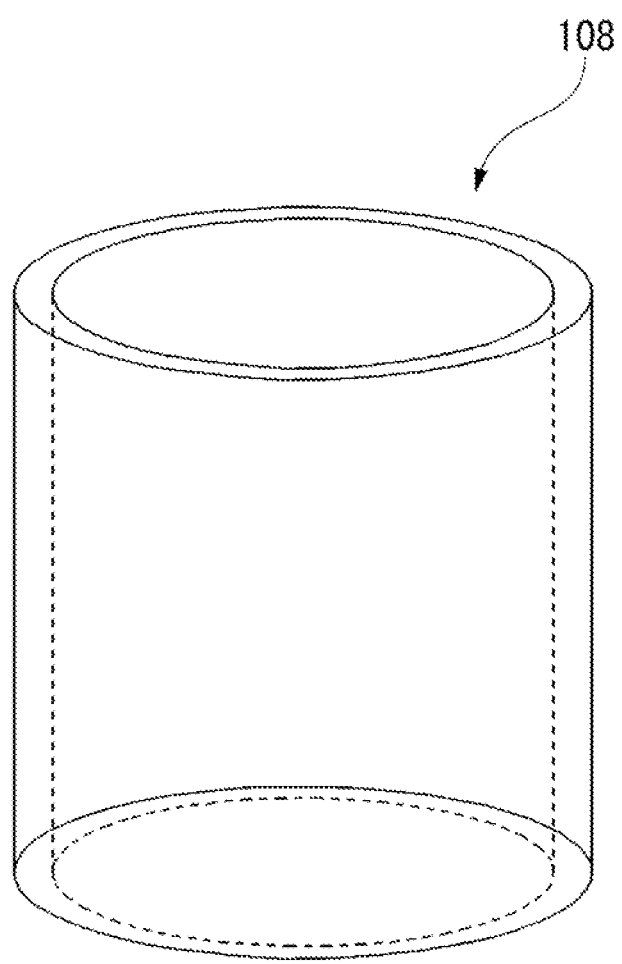
FIG. 15 is a perspective view of a tubular material of a comparative example.
Figure 16:
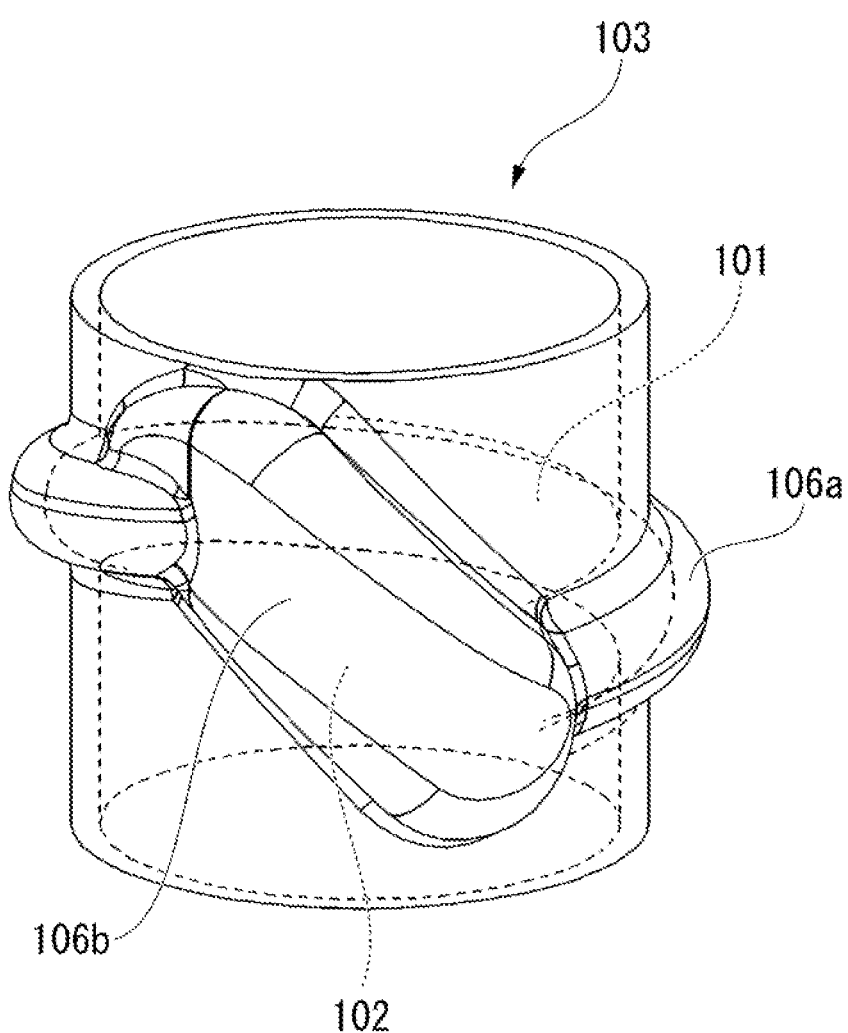
FIG. 16 is a perspective view of a tubular member of a comparative example.
Figure 17:
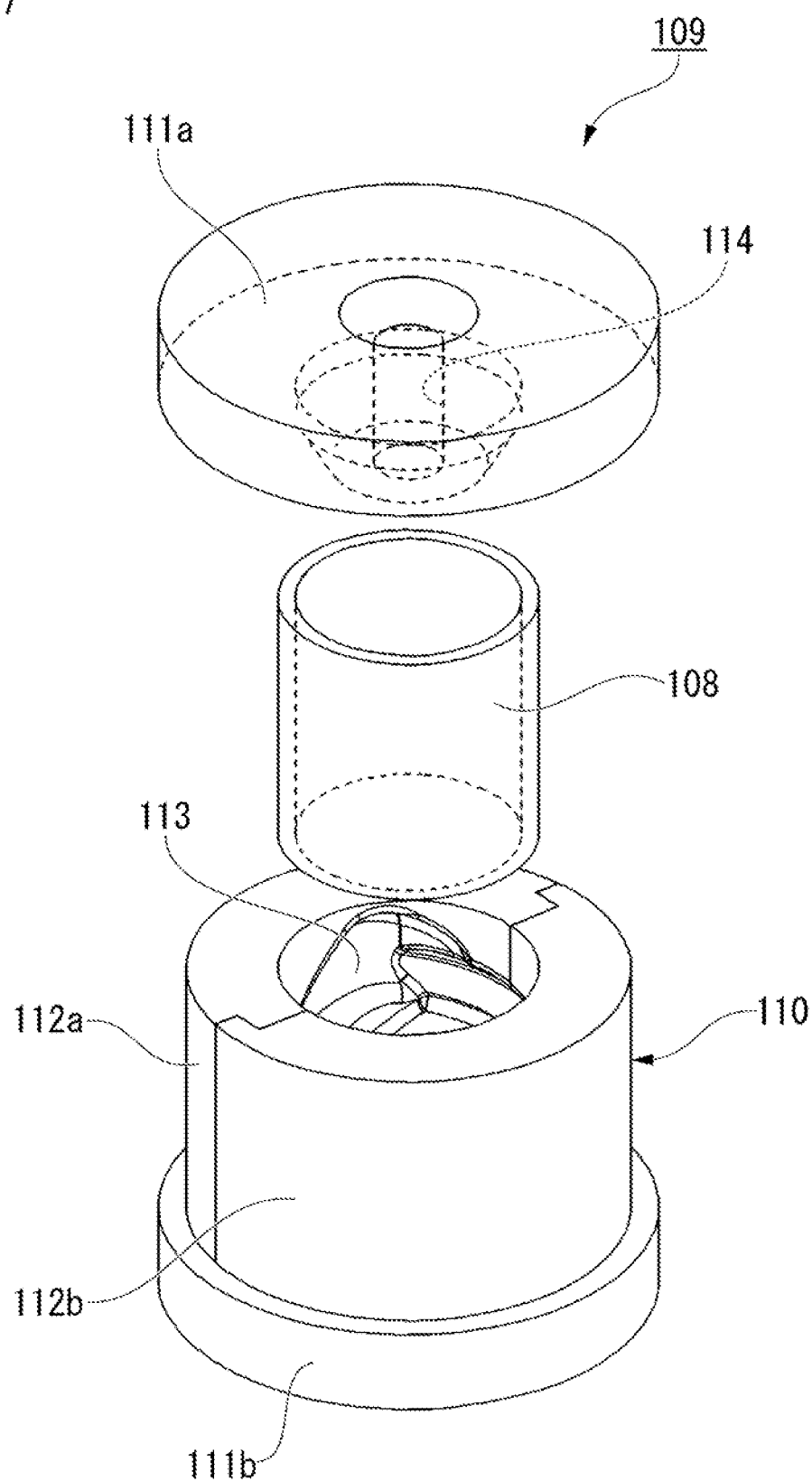
FIG. 17 is an exploded perspective view of a hydraulic forming apparatus and a tubular material of a comparative example.
Figure 18:
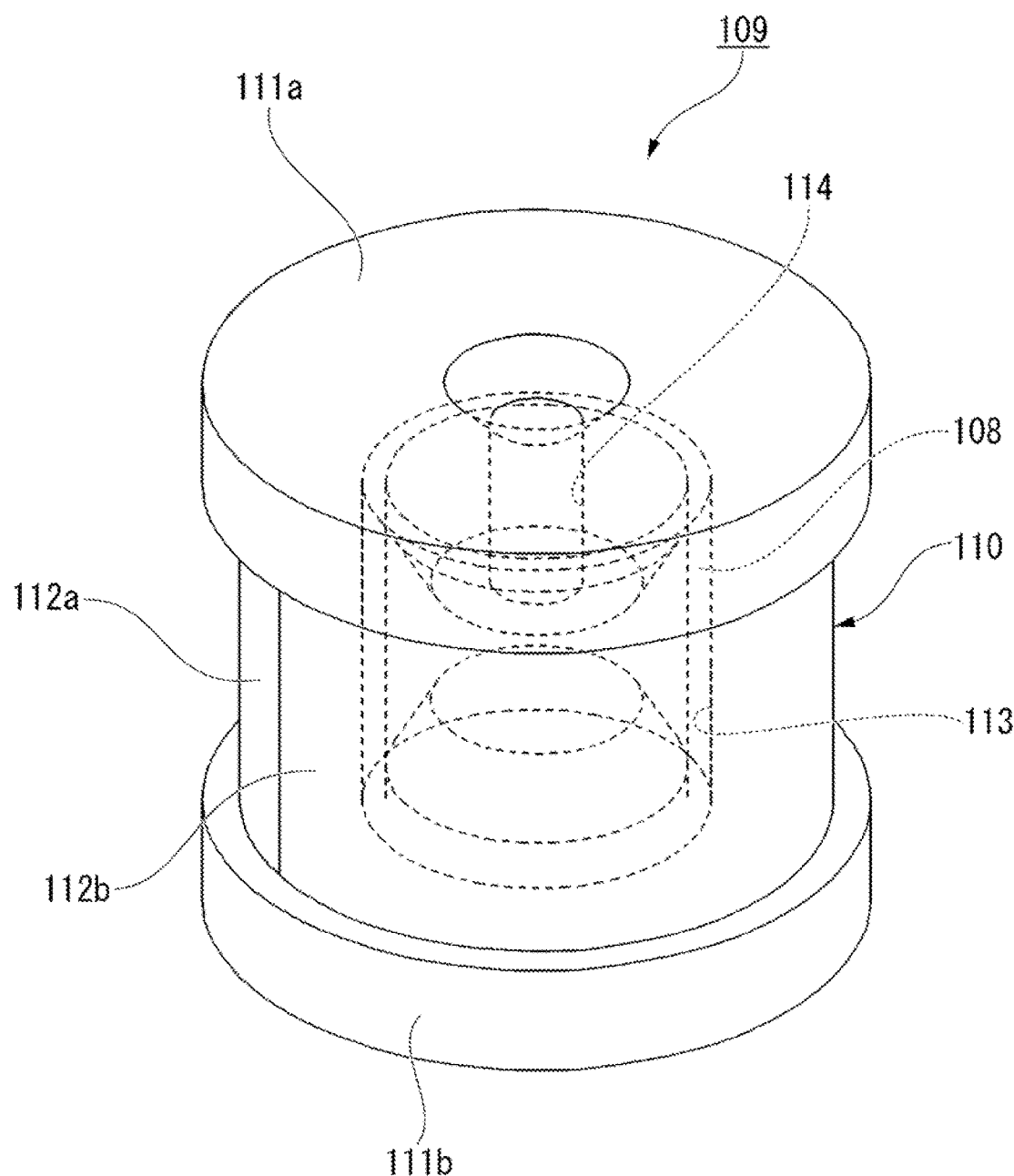
FIG. 18 is a perspective view of a hydraulic forming apparatus and a tubular material of a comparative example.
Figure 19:
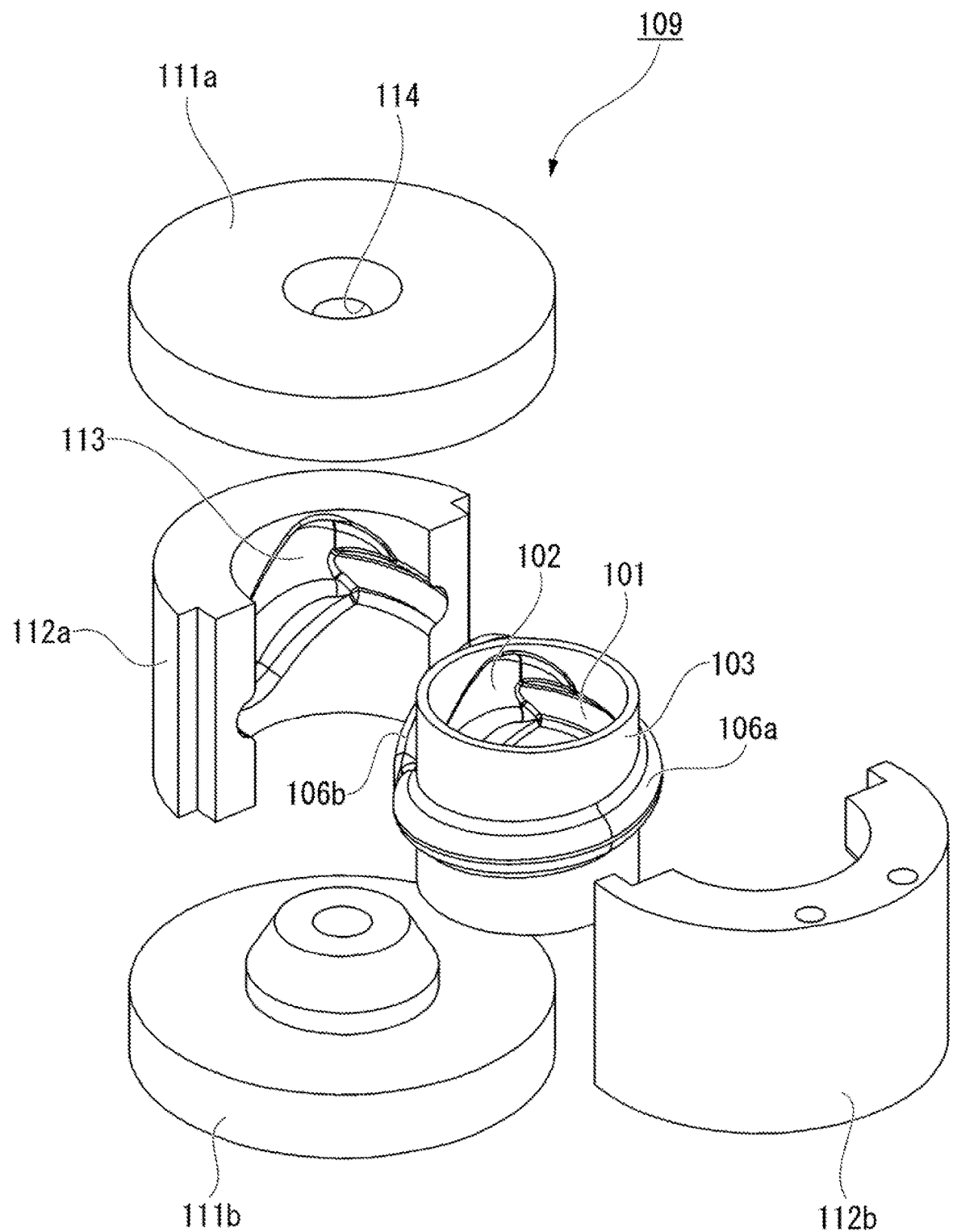
FIG. 19 is a perspective view showing a state in which the inside of a hydraulic forming apparatus is opened after hydraulic forming of a tubular member of a comparative example.
Figure 20:
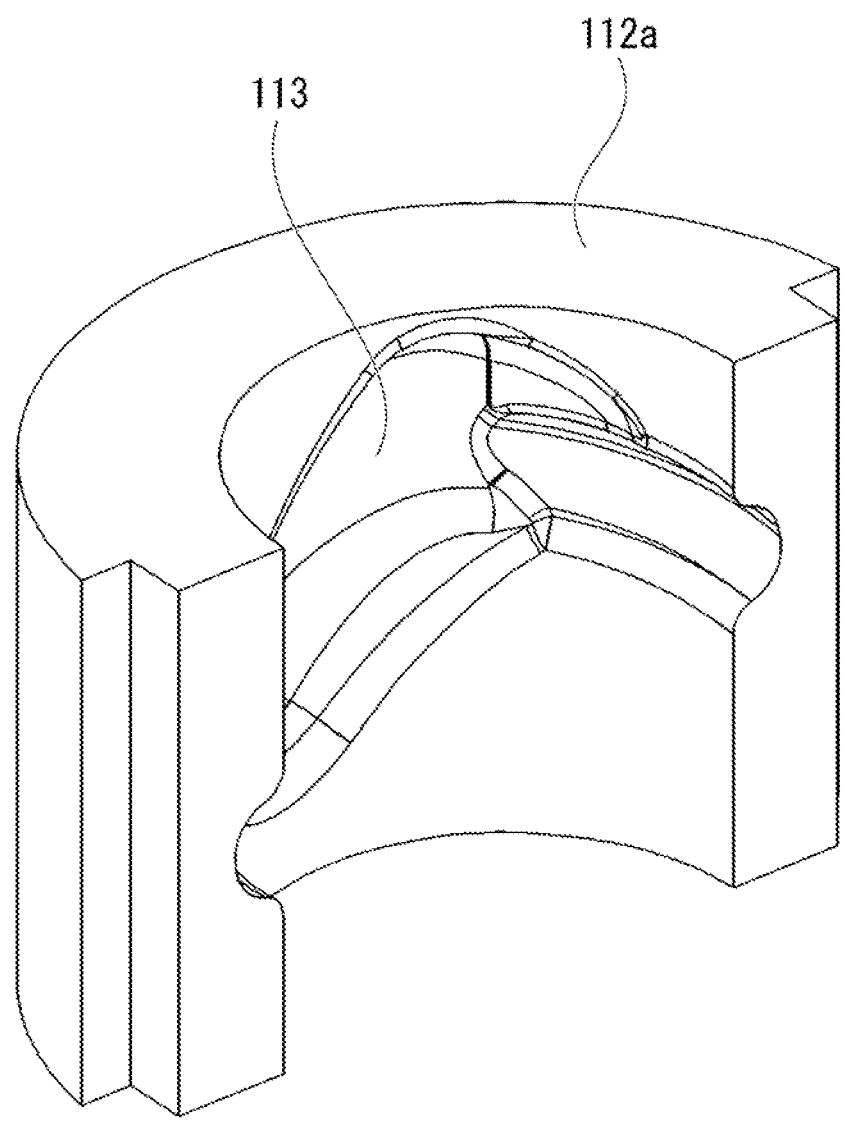
FIG. 20 is a perspective view showing one forming die element of a pair of forming die elements constituting a hydraulic forming apparatus of a comparative example.
Figure 21:
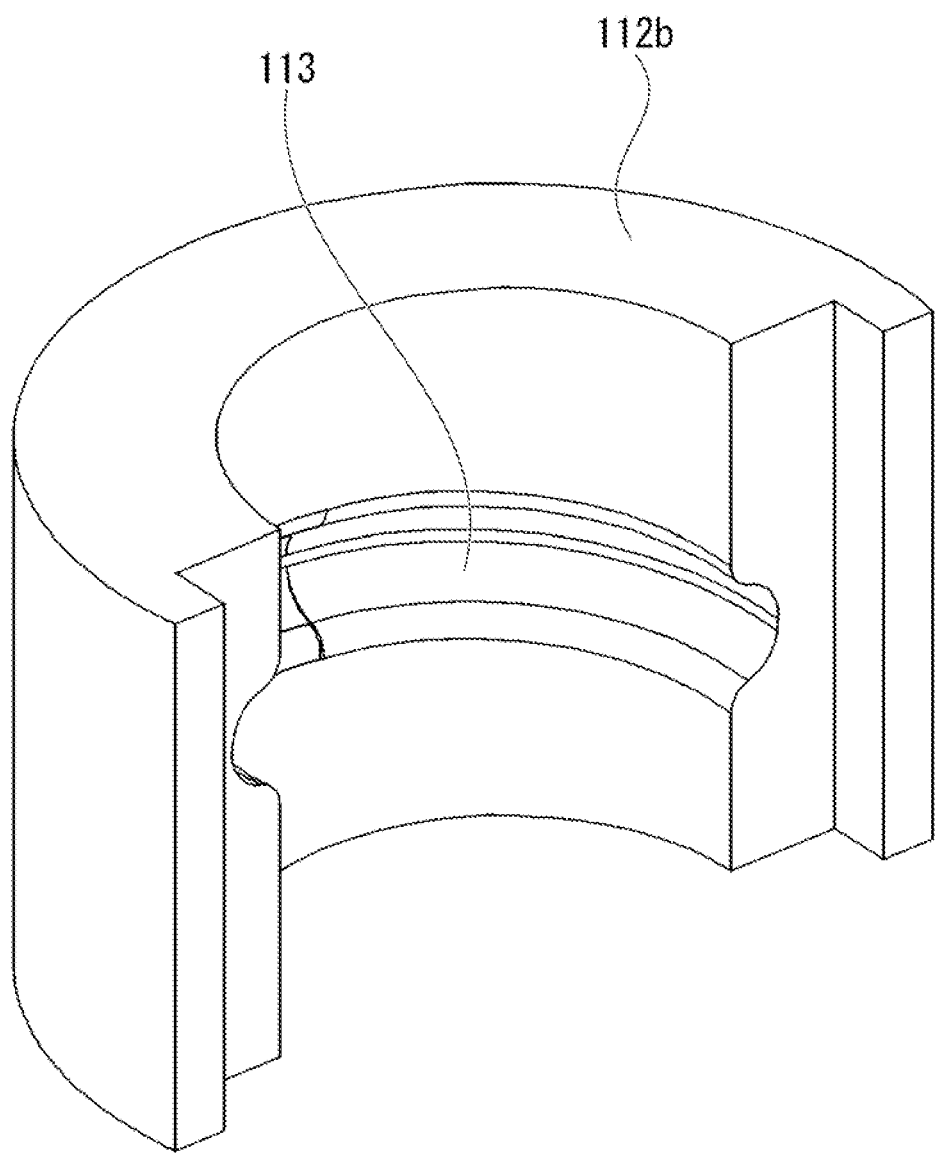
FIG. 21 is a perspective view showing one forming die element of a pair of forming die elements constituting a hydraulic forming apparatus of a comparative example.

Then, as shown in FIG. 11, the tubular member 10, the forming die 30 (reinforcing material 12), and the key 13 which are combined with each other are pulled out in the axial direction from the radial inside of the outer cylinder member 28. Then, the nut 3 is obtained in such a manner that the holder 11 is formed by combining the pair of holder elements 16 and the tubular member 10, the forming die 30 (reinforcing material 12), and the key 13 which are combined with each other are held on the radial inside of the holder 11.

Then, as shown in FIG. 2, the spiral load path 5 is formed between the outer peripheral surface of the screw shaft 2 and the inner peripheral surface of the nut 3 by disposing the screw shaft 2 to be inserted to the radial inside of the nut 3 manufactured in this way. At the same time, the ball screw device 1 is obtained by arranging the plurality of balls 4 in the load path 5 and the circulation groove 9 in a rollable manner.

According to the hydraulic forming method of this example described above, the manufacturing cost of the forming die 30 (reinforcing material 12) is suppressed. That is, in this example, the forming die 30 (reinforcing material 12) is formed by laminating the plurality of flat plate materials 22a and 22b having the inner peripheral surfaces and the forming peripheral surface 23 is formed by combining the inner peripheral surfaces of the plate materials 22a and 22b. On the other hand, each of the plate materials 22a and 22b can be manufactured at a relatively low cost by subjecting a metal plate as a material to a press punching process or a laser cutting process. Thus, in this example, the cost for forming the forming peripheral surface 23 is suppressed, so that the manufacturing cost of the forming die 30 (reinforcing material 12) is suppressed.

Further, in this example, the manufacturing cost of the nut 3 is suppressed. That is, the nut-side ball screw groove 8 provided in the inner peripheral surface of the nut 3 is a portion in which the plurality of balls 4 roll while receiving a compressive load. Therefore, the nut-side ball screw groove 8 needs to be formed by using a metal material such as bearing steel, which has excellent durability against rolling fatigue and rolling friction. However, when the entire nut is formed by using such a material, the material cost of the nut increases. In contrast, in this example, the nut-side ball screw groove 8 is provided in the inner peripheral surface of the tubular member 10 which is a substantially cylindrical thin member. Therefore, a material having excellent durability against rolling fatigue and rolling friction, such as bearing steel, may be used only for the tubular member 10. Thus, the material cost of the nut 3 is suppressed and the manufacturing cost of the nut 3 is suppressed from this aspect.

Further, in this example, as described above, the manufacturing cost of the reinforcing material 12 (forming die 30) is suppressed. That is, in order to properly support a radial load and a thrust load applied to the nut-side ball screw groove 8, it is necessary to dispose the reinforcing material to closely fill a gap of a complicated shape existing between the outer peripheral surface of the tubular member 10 and the inner peripheral surface of the tubular portion 17 of the holder 11. If such a reinforcing material is formed by one component and the reinforcing material has sufficient durability, the material cost or the forming cost of the reinforcing material increases. In contrast, in this example, since the reinforcing material 12 (forming die 30) is formed by laminating the plurality of plate materials 22a and 22b and each of the plate materials 22a and 22b is formed by subjecting a metal plate as a material to a press punching process or a laser cutting process, the manufacturing cost can be relatively low. Therefore, the manufacturing cost of the reinforcing material 12 (the forming die 30) is suppressed. Thus, the manufacturing cost of the nut 3 is suppressed from this aspect as well.

Further, in this example, the forming die 30 used when forming the tubular member 10 by the hydraulic forming method is directly used as the reinforcing material 12 constituting the nut 3. Therefore, the assembling of the nut 3 can be facilitated and the manufacturing cost of the nut 3 can be suppressed from this aspect as well.

Additionally, in the above-described embodiment, the machine component manufactured by using the hydraulic forming method of the present invention is the nut constituting the ball screw device. However, the machine component can be various machine components such as an outer race constituting a radial rolling bearing and a steering column constituting a steering device. Additionally, when the outer race constituting the radial rolling bearing is the machine component, a formed member (tubular member) includes an outer race track formed on an inner peripheral surface.

Further, when performing the machine component manufacturing method of the present invention, a forming die may be removed from the periphery of the formed member, in other words, the forming die may not be used as a reinforcing material after forming the formed member as a final product by the hydraulic forming method.

In one embodiment, the hydraulic forming method includes obtaining a forming die including a forming peripheral surface formed on an inner peripheral surface by laminating a plurality of flat plate materials including inner peripheral surfaces, disposing a material on a radial inside of the forming peripheral surface of the forming die, and plastically deforming the material radially outward until the material has a shape along the forming peripheral surface by applying a hydraulic pressure to the inner peripheral surface of the material.

In one embodiment, the machine component manufacturing method is a method of manufacturing a machine component including a formed member and the machine component is manufactured by using the hydraulic forming method.

In an aspect of the machine component manufacturing method, the machine component further includes a holder holding the formed member on the radial inside and a reinforcing material disposed between the outer peripheral surface of the formed member and the inner peripheral surface of the holder.

In an aspect of the machine component manufacturing method, the machine component is a nut constituting a ball screw device and the formed member includes a nut-side ball screw groove formed on the inner peripheral surface.

In an aspect of the machine component manufacturing method, the machine component is an outer race constituting a radial rolling bearing and the formed member includes an outer race track formed on the inner peripheral surface.

In an aspect of the machine component manufacturing method, the machine component is a steering column constituting a steering device.

In one embodiment, the machine manufacturing method is used to manufacture a machine including a machine component.

In one embodiment, the machine manufacturing method manufactures the machine component by the machine component manufacturing method of the present invention.

In one embodiment, the vehicle manufacturing method is used to manufacture a vehicle including a machine component.

In one embodiment, the vehicle manufacturing method manufactures the machine component by the machine component manufacturing method of the present invention.

In one embodiment, the ball screw device includes a nut including a nut-side ball screw groove formed on an inner peripheral surface, a screw shaft including a shaft-side ball screw groove formed on an outer peripheral surface, and a plurality of balls arranged between the nut-side ball screw groove and the shaft-side ball screw groove.

The nut includes a metallic formed member including the nut-side ball screw groove formed on an inner peripheral surface, a holder holding the tubular member on the radial inside, and a reinforcing material disposed between the outer peripheral surface of the tubular member and the inner peripheral surface of the holder.

The reinforcing material is formed by laminating a plurality of flat plate materials having inner peripheral surfaces.

The inner peripheral surface of the reinforcing material has a shape matching the outer peripheral surface of the formed member.

In an aspect of the ball screw device, the formed member and the plurality of plate materials are respectively formed of different materials.

In an aspect of the ball screw device, the inner peripheral surface of the reinforcing material has a shape in which the inner peripheral surface of the formed member is offset radially outward by the thickness of the formed member.

In an aspect of the ball screw device, the thickness of the plate material is different for each axial position of the plate material.

In this case, for example, the thickness of the plate material disposed at the axial position corresponding to the portion in which the ball of the nut is disposed is thinner than the thickness of the plate material disposed at the axial position corresponding to the portion in which the ball of the nut is not disposed.

In one embodiment, the machine includes a ball screw device and the ball screw device is the ball screw device of the present invention.

In one embodiment, the vehicle includes a ball screw device and the ball screw device is the ball screw device of the present invention.

In one embodiment, the hydraulic forming die is formed by laminating a plurality of flat plate materials having inner peripheral surfaces and has a forming peripheral surface formed on the inner peripheral surface.

In an aspect of the hydraulic forming die, the plurality of plate materials respectively include phase matching engagement portions for matching circumferential phases of the plurality of plate materials.

The technical scope of the present invention is not limited to the scope described in the embodiment. Various changes or improvements can be made to the embodiment. Such changed or improved forms can be also included in the technical scope of the present invention. Further, the present invention is not limited to the described embodiment, and any combination of these configurations may be used.

The machine component can be applied to a machine having a rotating portion, various manufacturing devices, for example, a rotating support portion of a linear moving device such as an actuator (combination of a linear motion guide bearing and a ball screw, an XY table, or the like). Further, the machine component is applicable to a steering device such as a wiper, a power window, an electric door, an electric seat, a steering column (for example, an electric tilt telescopic steering column), a universal joint, an intermediate gear, a rack and pinion, an electric power steering device, and a worm reducer. Further, the machine component is applicable to various vehicles such as an automobile, a motorcycle, and a railway. This configuration can be suitably applied to any machine component having a formed element, which can lead to cost reduction.

REFERENCE SIGNS LIST

1 Ball screw device
2 Screw shaft
3 Nut
4 Ball
5 Load path
7 Shaft-side ball screw groove
8 Nut-side ball screw groove
9 Circulation groove
10 Formed member (second member, tubular member)
11 Holder (first member)
12 Reinforcing material (third member)
12A Laminate body
13 Key
14a, 14b Convex portion
15 Cylindrical portion
16 Holder element
17 Tubular portion
18a, 18b Inward flange portion
19 Outward flange portion
20 Outer key groove
21 Attachment hole
22a, 22b Plate material (plate)
23 Inner surface (forming peripheral surface)
24 Inner key groove
25 Notch (phase matching engagement portion)
26 Material (tubular material)
27 Hydraulic forming apparatus
28 Outer cylinder member
29a, 29b Lid
30 Forming die
31 Key holding groove
32 Passage hole
100 Nut
101 Nut-side ball screw groove
102 Circulation groove
103 Tubular member
104 Holder
105 Reinforcing material
106a, 106b Convex portion
107 Holder element
108 Tubular material
109 Hydraulic forming apparatus
110 Forming die
111a, 111b Lid
112a, 112b Forming die element
113 Forming peripheral surface
114 Passage hole
115 Through-hole

The invention claimed is:

1. A machine component manufacturing method comprising:
preparing a forming die with a laminate body having a plurality of plates laminated in an axial direction, the laminate body including an inner surface for a forming;
disposing a process material on the inside of the forming die;
plastically deforming the process material toward the inner surface of the forming die by applying a hydraulic pressure to an inner surface of the process material; and
assembling (a) the plastically deformed process material and (b) the laminate body used as the forming die when the process material was plastically deformed.

2. A machine component manufactured by the manufacturing method according to claim 1,
wherein the machine component comprises (a) the plastically deformed process material and (b) the laminate body used as the forming die when the process material was plastically deformed.

3. A machine comprising:
a body; and
the machine component according to claim 2.

4. A vehicle comprising:
a body; and
the machine component according to claim 2.

5. A machine manufacturing method comprising:
manufacturing a machine component by using the manufacturing method according to claim 1, and
assembling the machine component to a body.

6. A vehicle manufacturing method comprising:
manufacturing a machine component by using the manufacturing method according to claim 1, and
assembling the machine component to a body.

7. A hydraulic forming method comprising:
preparing a tubular forming die with a laminate body having a plurality of plates laminated in an axial direction, the laminate body including an inner peripheral surface for a forming;
disposing a process material on the inside of the tubular forming die; and
plastically deforming the process material toward the inner peripheral surface of the tubular forming die by applying a hydraulic pressure to an inner surface of the process material,
the inner peripheral surface of the laminate body includes a plurality of steps, each of the steps being based on a difference in inner surface height of two adjacent plates,
a contour of an outer surface of the plastically deformed process material has a curved shape, and
a curved line connecting a plurality of corners of the steps has a shape substantially matching the curved shape of the plastically deformed process material.

* * * * *